(12) United States Patent
Malins

(10) Patent No.: US 11,891,468 B1
(45) Date of Patent: Feb. 6, 2024

(54) POLYMERS AND MEMBRANES WITH ACRYLAMIDE MOIETY

(71) Applicant: Dioxycle, Bordeaux (FR)

(72) Inventor: Edward Luke Malins, Bordeaux (FR)

(73) Assignee: Dioxycle, Bordeaux (FR)

( * ) Notice: Subject to any disclaimer, the term of this patent is extended or adjusted under 35 U.S.C. 154(b) by 0 days.

(21) Appl. No.: 18/129,792

(22) Filed: Mar. 31, 2023

Related U.S. Application Data

(60) Provisional application No. 63/419,353, filed on Oct. 26, 2022, provisional application No. 63/393,821, filed on Jul. 29, 2022.

(51) Int. Cl.
| | | |
|---|---|---|
| *C08F 220/56* | (2006.01) | |
| *C08K 5/01* | (2006.01) | |
| *C08F 212/08* | (2006.01) | |
| *C25B 13/08* | (2006.01) | |
| *C25B 9/19* | (2021.01) | |
| *C08F 8/02* | (2006.01) | |

(52) U.S. Cl.
CPC ............. *C08F 220/56* (2013.01); *C08F 8/02* (2013.01); *C08F 212/08* (2013.01); *C08K 5/01* (2013.01); *C25B 9/19* (2021.01); *C25B 13/08* (2013.01); *C08F 2810/50* (2013.01)

(58) Field of Classification Search
CPC ..... C08F 212/08; C08F 220/56; C08F 212/36
See application file for complete search history.

(56) References Cited

U.S. PATENT DOCUMENTS

| | | | |
|---|---|---|---|
| 8,313,651 B2 | 11/2012 | Childs et al. | |
| 9,321,047 B2 | 4/2016 | Jikihara et al. | |
| 2009/0325101 A1* | 12/2009 | Ikami | G03G 9/0804 430/137.14 |
| 2009/0326210 A1* | 12/2009 | Mori | C08F 8/12 521/147 |
| 2010/0155258 A1 | 6/2010 | Kirk et al. | |
| 2012/0035280 A1 | 2/2012 | Jikihara et al. | |
| 2013/0186761 A1 | 7/2013 | Wal et al. | |
| 2020/0119379 A1* | 4/2020 | Liberatore | C08F 220/56 |
| 2021/0222308 A1 | 7/2021 | Fujinuma | |
| 2021/0305612 A1 | 9/2021 | Oh et al. | |

(Continued)

FOREIGN PATENT DOCUMENTS

| | | |
|---|---|---|
| CN | 100338807 C | 9/2007 |
| EP | 1786054 A1 | 5/2007 |

(Continued)

OTHER PUBLICATIONS

Translation of JP 2005/220271 (Year: 2005).*

(Continued)

*Primary Examiner* — Robert C Boyle
(74) *Attorney, Agent, or Firm* — Daylight Law, P.C.

(57) ABSTRACT

Polymers and membranes with acrylamide moieties are disclosed herein. A disclosed copolymer includes first repeat units of an acrylamide moiety and second repeat units of a hydrophobic moiety. The molar ratio of second repeat units: first repeat units is between 0.8:1 to 2.5:1 based on a molar ratio of the respective monomers in a production feed. The disclosed copolymer can also include a crosslinker. The amount of cross-linker in a corresponding monomer feed is 0 to 1 mol %, based on the total monomer in the production feed.

27 Claims, 12 Drawing Sheets

(56) References Cited

U.S. PATENT DOCUMENTS

| | | | |
|---|---|---|---|
| 2022/0213281 A1 | 7/2022 | Kingsbury et al. | |
| 2023/0307662 A1 | 9/2023 | Lee et al. | |

FOREIGN PATENT DOCUMENTS

| | | | |
|---|---|---|---|
| EP | 3112401 | A1 | 1/2017 |
| JP | 2000309654 | A | 11/2000 |
| JP | 2005/220271 | * | 8/2005 |
| JP | 2006073235 | A | 3/2006 |
| JP | 4763591 | B2 | 8/2011 |
| JP | 2015020093 | A | 2/2015 |
| JP | 2018070797 | A | 5/2018 |
| KR | 20060075775 | A | 7/2006 |
| KR | 100796989 | B1 | 1/2008 |
| KR | 101285709 | B1 | 7/2013 |
| WO | 2006127309 | A3 | 10/2007 |

OTHER PUBLICATIONS

A. Das et al. 2015. "Characterization of Low Cost Ion Conducting Poly(AAc-co-DMAPMA) Membrane for Fuel Cell Application". Materials Sciences and Applications, 6, 234-241. doi: 10.4236/msa.2015.63028.

A. Rabiee et al. "A survey on cationic polyelectrolytes and their applications: acrylamide derivatives" Reviews in Chemical Engineering 31, No. 3 (2015): 239-261. https://doi.org/10.1515/revce-2014-0056.

F. G. Alabtah et al. 2022. "New Insights into the Mechanical Behavior of Thin-Film Composite Polymeric Membranes" Polymers 14, No. 21: 4657. https://doi.org/10.3390/polym14214657.

G. H. Koops et al. 1994. "Selectivity as a Function of Membrane Thickness: Gas Separation and Pervaporation". b1639-1652. https://ris.utwente.nl/ws/portalfiles/portal/6692696/Koops9selectivity.pdf.

H. Lee et al. "A review of recent developments in membrane separators for rechargeable lithium-ion batteries". Energy & Environmental Science 2014, 7, 3857-3886. https://doi.org/10.1039/C4EE01432D.

M. Charyton et al. 2021. "Composite Anion-Exchange Membrane Fabricated by UV Cross-Linking Vinyl Imidazolium Poly(Phenylene Oxide) with Polyacrylamides and Their Testing for Use in Redox Flow Batteries" Membranes 11, No. 6: 436. https://doi.org/10.3390/membranes11060436.

M. D. Pilar et al. 2020. "Development of mono and multilayer membranes of polypropylene and ethylene-propylene copolymers via cast film extrusion and stretching". http://hdl.handle.net/10803/672703.

Non-Final Office Action dated Jul. 10, 2023 from U.S. Appl. No. 18/129,798, 19 pages.

Final Office Action dated Oct. 17, 2023 from U.S. Appl. No. 18/129,798, 16 pages.

J. C. Chaung et al. Copolymers of Hydrophilic and Hydrophobic Monomers. Benzene and Water Vapor Sorption Equilibria by Random Copolymers of Styrene and Acrylamide. Macromolecules (1973) vol. 6, No. 1, pp. 43-77. DOI: 10.1021/ma60031a007.

* cited by examiner

POLYMERS AND MEMBRANES WITH ACRYLAMIDE MOIETY

CROSS REFERENCE TO RELATED APPLICATIONS

This application claims the benefit of U.S. Provisional Patent No. 63/393,821 filed Jul. 29, 2022, and U.S. Provisional Patent No. 63/419,353, filed Oct. 26, 2022, both of which are incorporated by reference herein in their entireties for all purposes.

BACKGROUND OF THE INVENTION

Carbon dioxide ($CO_2$) accumulation in the atmosphere is a major culprit in global warming. Capturing it using a decarbonised source of electricity at emitting sources or directly from the air (through direct air capture) and converting it into valuable chemicals and fuels is a promising way to both reduce its atmospheric concentration and offer sustainable alternatives to current fossil-fuel-derived feedstocks. Among the envisioned conversion technologies, polymer-electrolyte-membrane-based electroreduction technology stands out by its versatility (possible use at a wide range of temperatures and pressures) and amenability to generate a wide range of products.

Such electrolyzers have gained significant interest over the last years, as they allow the production of valuable chemicals such as hydrogen, carbon monoxide (CO), ethylene, ethanol, methane, formic acid, oxalic acid, acetic acid, propane, propanol, ammonia, amino-acids, urea, carbon- and nitrogen-containing products through the conversion of water, carbon dioxide ($CO_2$), carbon monoxide and/or carbonate ions ($CO_3^{2-}$) or bicarbonate ions ($HCO_3^-$), and/or nitrogen-containing compounds such as but not limited to nitrous oxides and/or $N_2$.

Electrolyzers usually consist of multiple cells that are stacked onto each other. In a stack, each individual cell comprises an anode and a cathode, separated by a membrane to provide selective ion conductivity. Individual cells are physically supported on each side by conductive polar plates. Polar plates are configured to apply electric potential between the cathode and the anode to drive oxidation and reduction reactions of reactant fluids. Such reactant fluids are transported towards the anode and cathode through flow fields often supported by the polar plates. As the conversion of reactants into valuable molecules is driven by electrical power, it is desirable to increase the energy efficiency of the electrolyzers in order to reduce the power requirement. There is a need for suitable components, including membranes, for electrolyzers that support improved efficiency of performance.

SUMMARY OF THE INVENTION

Substituted and unsubstituted (meth)acrylamide monomers can be utilised for the preparation of homopolymers and copolymers for a diverse range of applications. These include, but are not limited to biological, medical, nanotechnology, materials, electronic, energy, catalysis, rheology, additives and electrochemistry. Substituted and unsubstituted (meth)acrylamides are versatile monomers for the preparation of polymers because of being commercially available, inexpensive, readily (co)polymerised by addition polymerization techniques, and available with a wide range of functionalities and modifiable by post-polymerization modification techniques. Moreover, a vast range of substituted and unsubstituted (meth)acrylamides monomers could be potentially synthesised by simple reactions between primary/secondary amines and (meth)acryloyl chloride, (meth)acrylic acid or (meth)acrylates.

However, while (meth)acrylamide monomers may be used in a wide range of applications, there is still a number of applications where (meth)acrylamides are not expected to perform well. In particular, applications where the (meth)acrylamide polymer could be exposed to ionic species ($H^+$, $OH^-$, etc.). These applications include anionic exchange membranes (AEMs). This is due to the ionic species causing degradation of the resulting (meth)acrylamide polymer.

Specifically, it would be expected that degradation can occur due to acid or base hydrolysis of the amide side group of the (meth)acrylamide. Hydrolysis of the amide side group of the (meth)acrylamide monomer unit would result in a decrease in the concentration of side chain functionality, as well as increasing the acidic character of the polymer backbone.

For example, high concentrations of hydroxyl anions at elevated temperature can cause nucleophilic substitution, E1 elimination and Hofmann degradation of AEMs. These concerns over base stability have caused the field to focus on AEMs that are free of chemical functionalities that are sensitive to hydrolysis, such as ethers, esters, amides, carbonates, urethanes, and ureas.

The inventor of the Present Application has surprisingly found that the novel (meth)acrylamide polymers prepared according to embodiments of the present invention show a tolerance to ionic species during electrolysis. Accordingly, the inventor has found a range of surprising new applications for (meth)acrylamide polymers, such as in the electrolysis of carbon dioxide, carbon monoxide and/or water.

Polymeric electrolyte membranes for use in electrochemical applications, such as the electrolysis of carbon dioxide, carbon monoxide and/or water are disclosed herein. The synthesis and preparation of such polymeric electrolyte membranes and the polymers which they contain are also disclosed.

In a first aspect, embodiments of the present invention relate to a polymer comprising first repeat units of an acrylamide moiety and second repeat units of a hydrophobic moiety, wherein the molar ratio of second repeat units:first repeat units is between 0.8:1 to 2.5:1 based on a molar ratio of the respective monomers in a production feed; and optionally further comprising a crosslinker wherein the amount of cross-linker in the corresponding monomer feed is about 0 to about 1 mol %, based on the total monomer in the production feed.

In a second aspect of the present invention embodiments of the invention provide a membrane comprising the polymer of the first aspect of the invention.

In a third aspect, embodiments of the invention provide a polymer electrolyte membrane comprising at least one membrane of the second aspect of the invention.

In a fourth aspect, embodiments of the invention provide a polymer electrolyte membrane comprising a plurality of membranes of the second aspect of the invention.

In a fifth aspect, embodiments of the present invention provide a polymer comprising first repeat units comprising an acrylamide moiety, wherein the polymeric membrane has a water uptake of from 30% to 200%. Water uptake may be measured as described below.

In a sixth aspect, embodiments of the invention provide an electrolytic cell comprising an anode, a cathode and a membrane positioned therebetween, wherein the membrane comprises a polymer electrolyte membrane according to the third or fourth aspect of the invention.

In a seventh aspect, embodiments of the invention provide a method of electrolysis comprising: providing an electrolytic cell according to the fifth aspect; supplying a reaction fluid comprising COx or $H_2O$ to the cathode; applying a first voltage across the anode and cathode; and collecting an electrochemical reaction product.

In an eighth aspect, embodiments of the invention provide the use of the polymeric membrane according to the third or fourth aspects of the invention in the electrolysis of carbon dioxide, carbon monoxide, and/or water.

In a ninth aspect, embodiments of the invention provide a method of forming a polymer of the first aspect, the method comprising forming a first polymer by: mixing a first monomer and a second monomer and an optional crosslinker wherein the molar ratio of the second monomer:first monomer is between 0.8:1 to 2.5:1 and the amount of cross-linker is about 0 to about 1 mol %, based on the total amount of monomer present; and initiating a polymerisation. The first monomer comprises an acrylamide moiety and the second monomer is hydrophobic.

Advantageously, the polymers of specific embodiments of the present invention show a tolerance to ionic species during electrolysis. This means that the polymers do not degrade when the polymers come in contact with an ionic species. Consequently, the polymers of specific embodiments of the present invention can be used in new applications in which the polymers were previously thought to be unsuitable for. For instance, applications involving polymer membranes, wherein the polymer membrane is exposed to an ionic species. These applications include the electrolysis of carbon dioxide, carbon monoxide, and/or water.

Advantageously, the polymers of specific embodiments of the present invention are easily moulded into defined sheet materials. This allows the polymers of specific embodiments of the present invention to be formed into polymeric electrolyte membranes, including ionic electrolyte membranes and specifically anionic exchange membranes. Applications which may utilise the polymeric electrolyte membranes of specific embodiments of the present invention include an electrochemical process that requires the transportation of ionic species through a membrane, such as in the electrolysis of carbon dioxide, carbon monoxide, and/or water.

Advantageously, the polymers of specific embodiments of the present invention are stable in basic environments. This means that the polymers of specific embodiments of the present invention may be formed into membranes wherein the membranes may function as anionic exchange membranes (AEMs). These AEMs may then be used in systems to facilitate the transport of anions ($OH^-$, $CO_3^{2-}$, $Cl^-$, etc.) across an electrochemical cell from cathode to anode.

Advantageously, the polymers of specific embodiments of the present invention are mechanically, chemically, and thermally stable over long durations. This gives the polymers disclosed herein particular utility in AEMs. Furthermore, it has been found that specific embodiments of the present invention perform surprisingly well in such electrolysis applications.

BRIEF DESCRIPTION OF THE DRAWINGS

Examples of the present invention will now be described in detail with reference to the accompanying figures.

DETAILED DESCRIPTION

Figure 1:
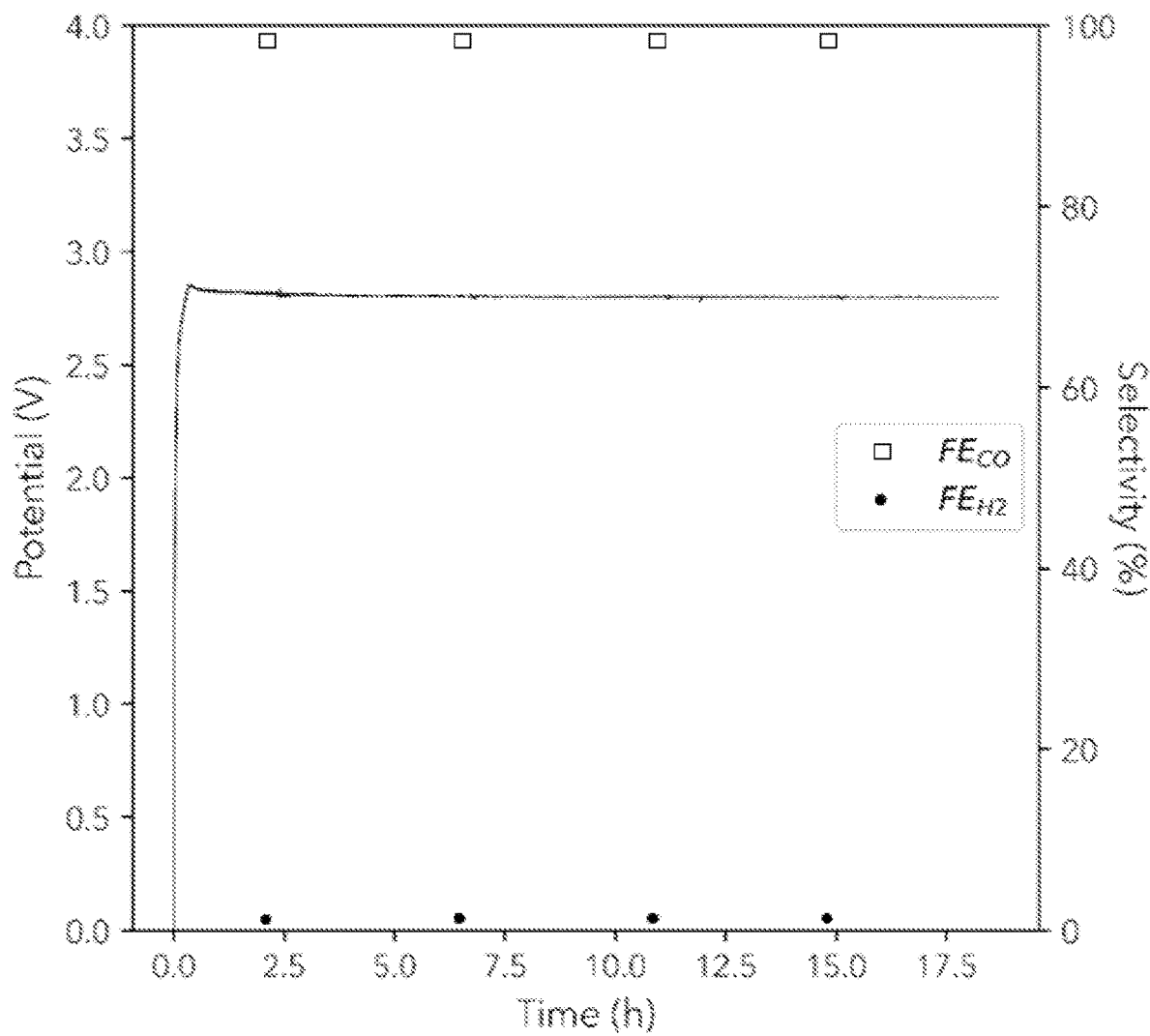
FIG. 1 is a graph showing voltage and FE against time for the conversion of $CO_2$ to CO using the membrane M1.2, electrolysis performed at 5 $cm^2$ cell scale operating at 200 $mA/cm^2$.
Figure 2:
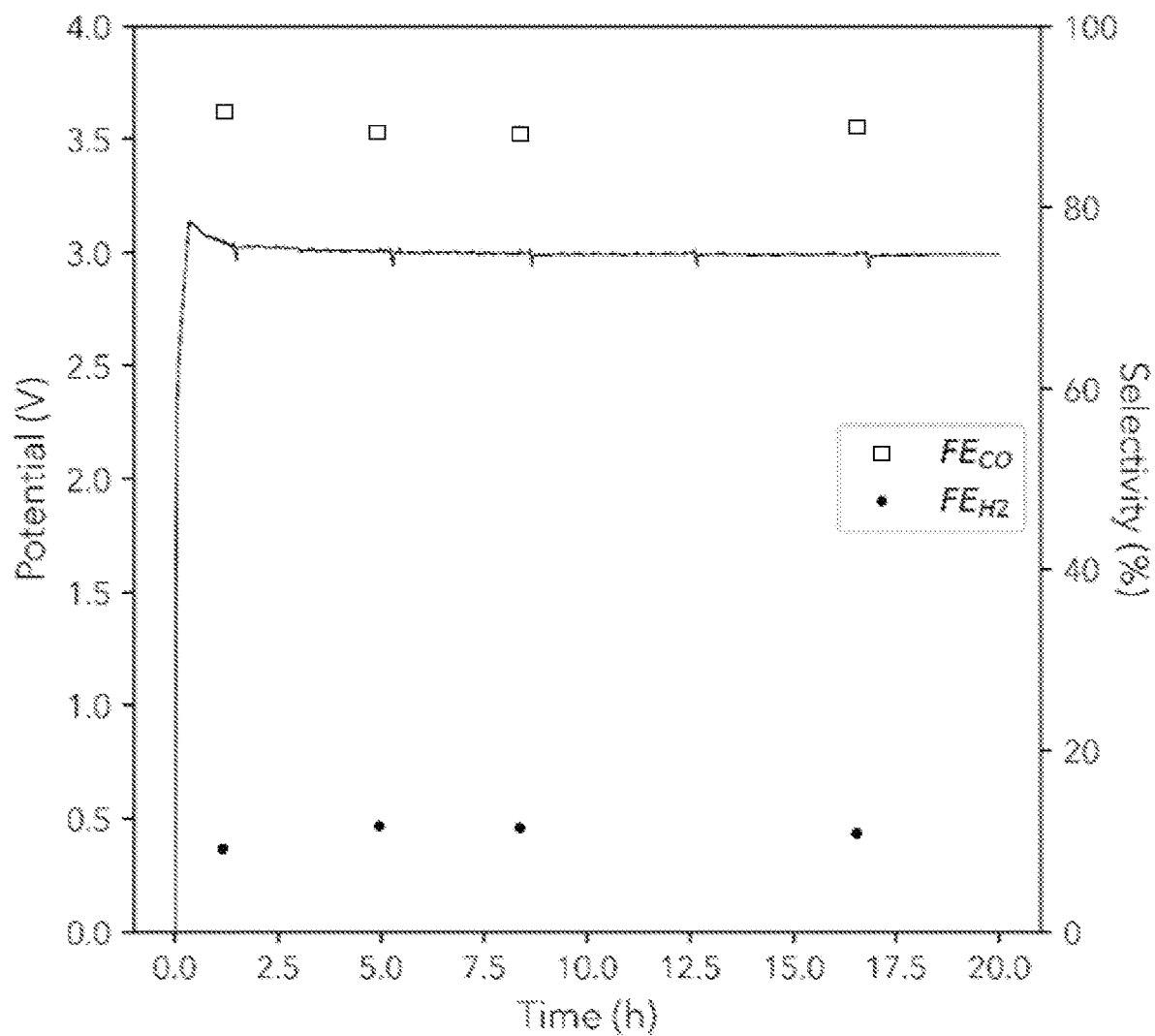
FIG. 2 is a graph showing voltage and FE against time for the conversion of $CO_2$ to CO using the membrane M1.3, electrolysis performed at 5 $cm^2$ cell scale operating at 200 $mA/cm^2$.
Figure 3:
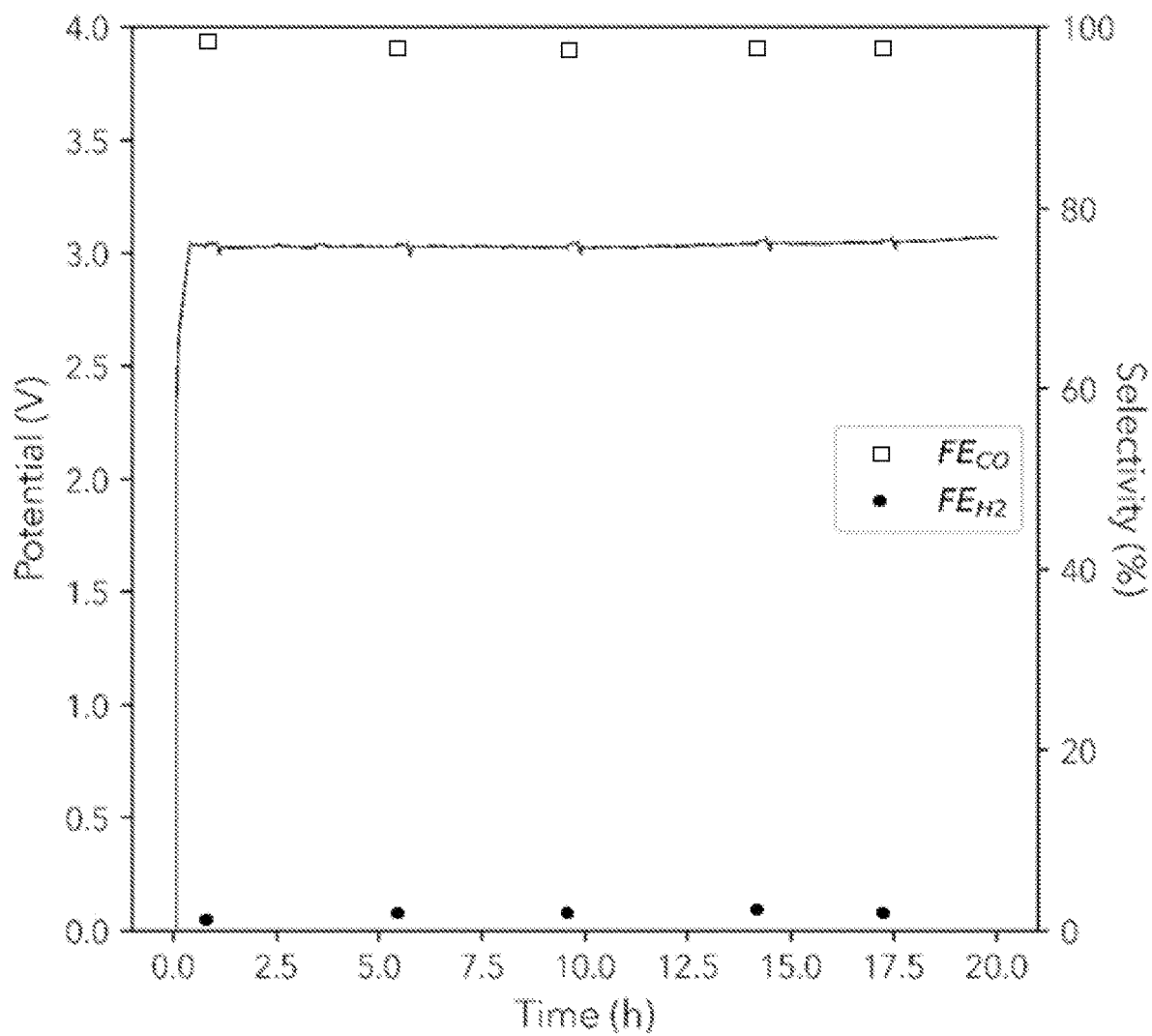
FIG. 3 is a graph showing voltage and FE against time for the conversion of $CO_2$ to CO using the membrane M1.4, electrolysis performed at 5 $cm^2$ cell scale operating at 200 $mA/cm^2$.
Figure 4:
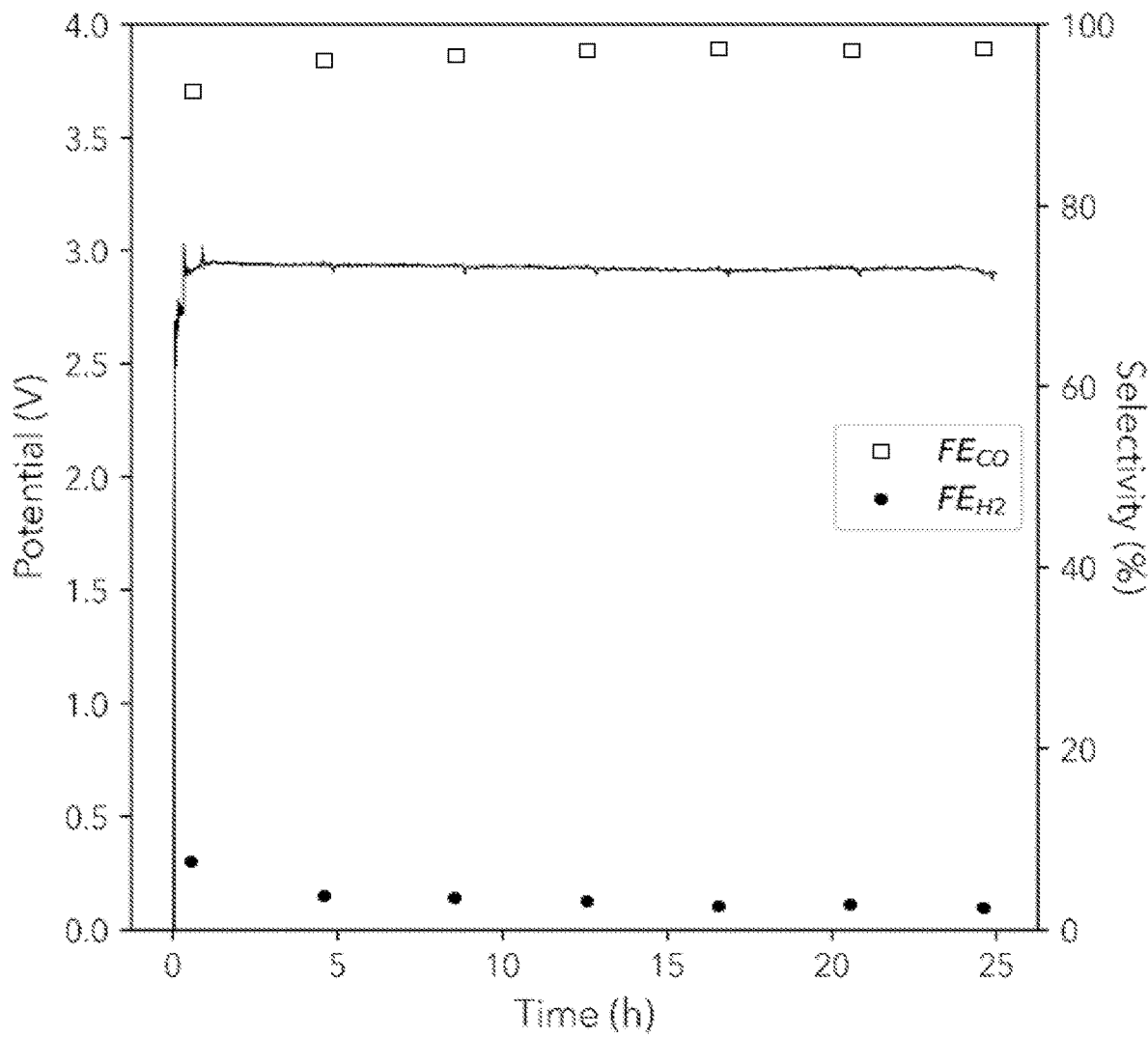
FIG. 4 is a graph showing voltage and FE against time for the conversion of $CO_2$ to CO using the membrane M1.5, electrolysis performed at 5 $cm^2$ cell scale operating at 200 $mA/cm^2$.
Figure 5:
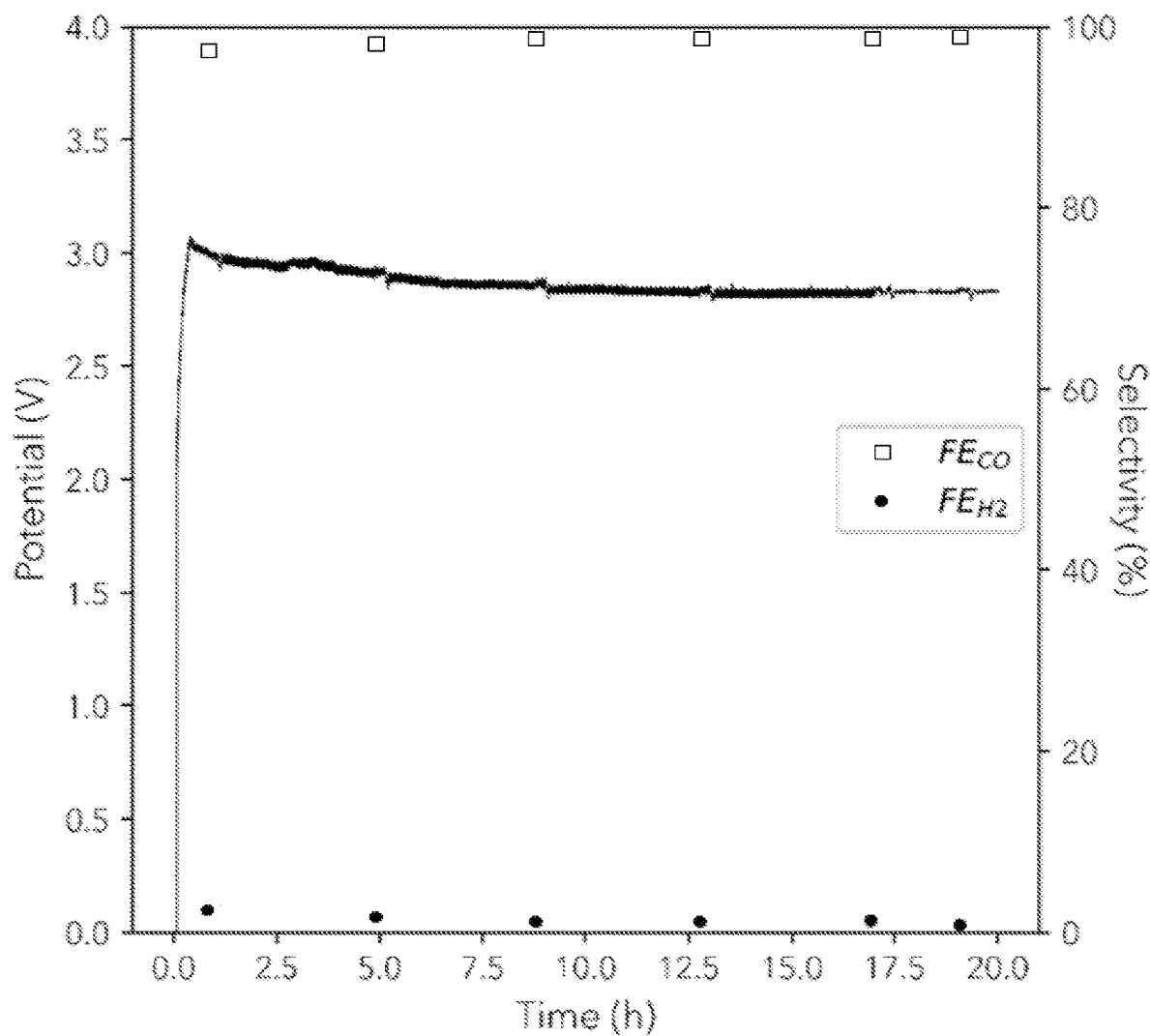
FIG. 5 is a graph showing voltage and FE against time for the conversion of $CO_2$ to CO using the membrane M1.6, electrolysis performed at 5 $cm^2$ cell scale operating at 200 $mA/cm^2$.
Figure 6:
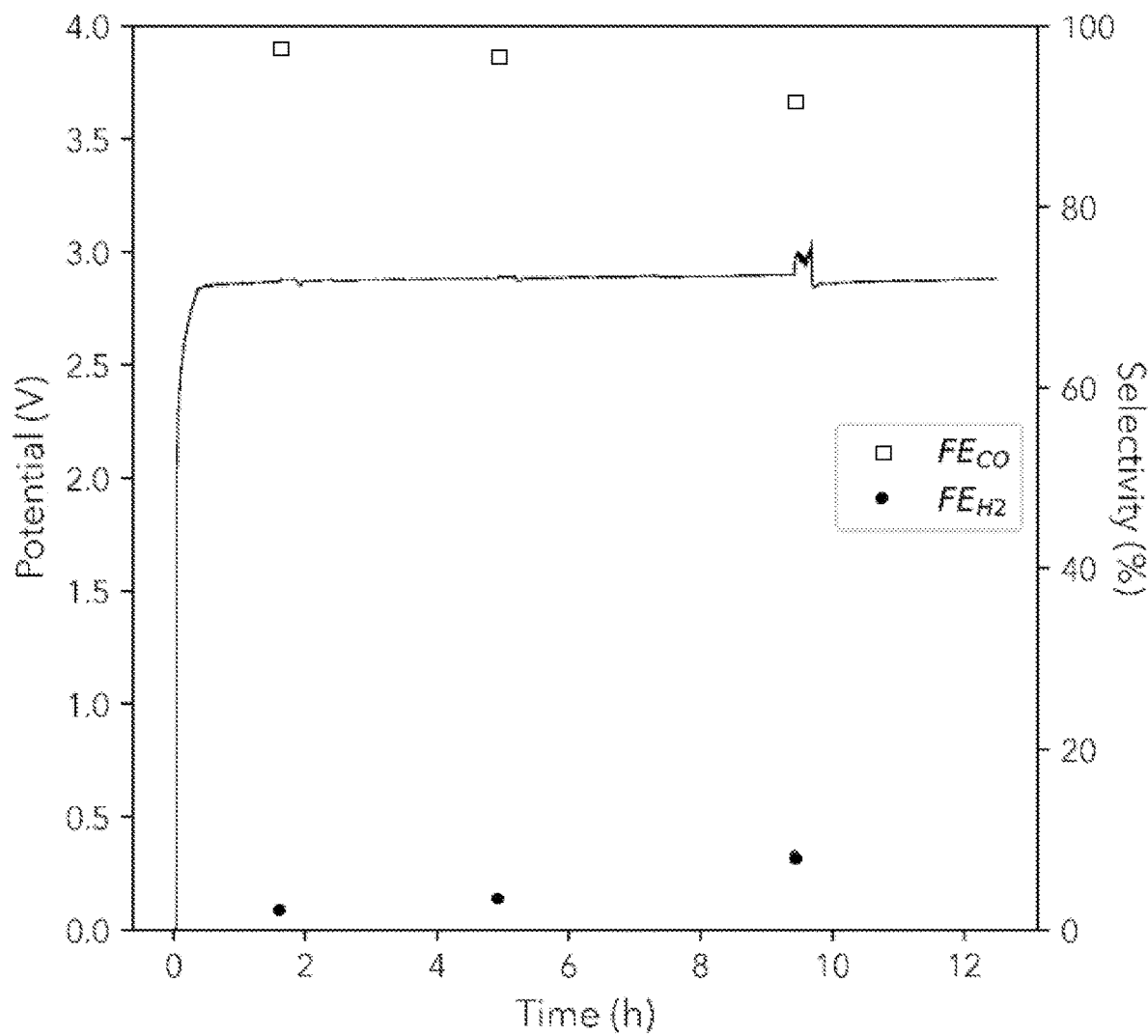
FIG. 6 is a graph showing voltage and FE against time for the conversion of $CO_2$ to CO using the membrane M1.7, electrolysis performed at 5 $cm^2$ cell scale operating at 200 $mA/cm^2$.
Figure 7:
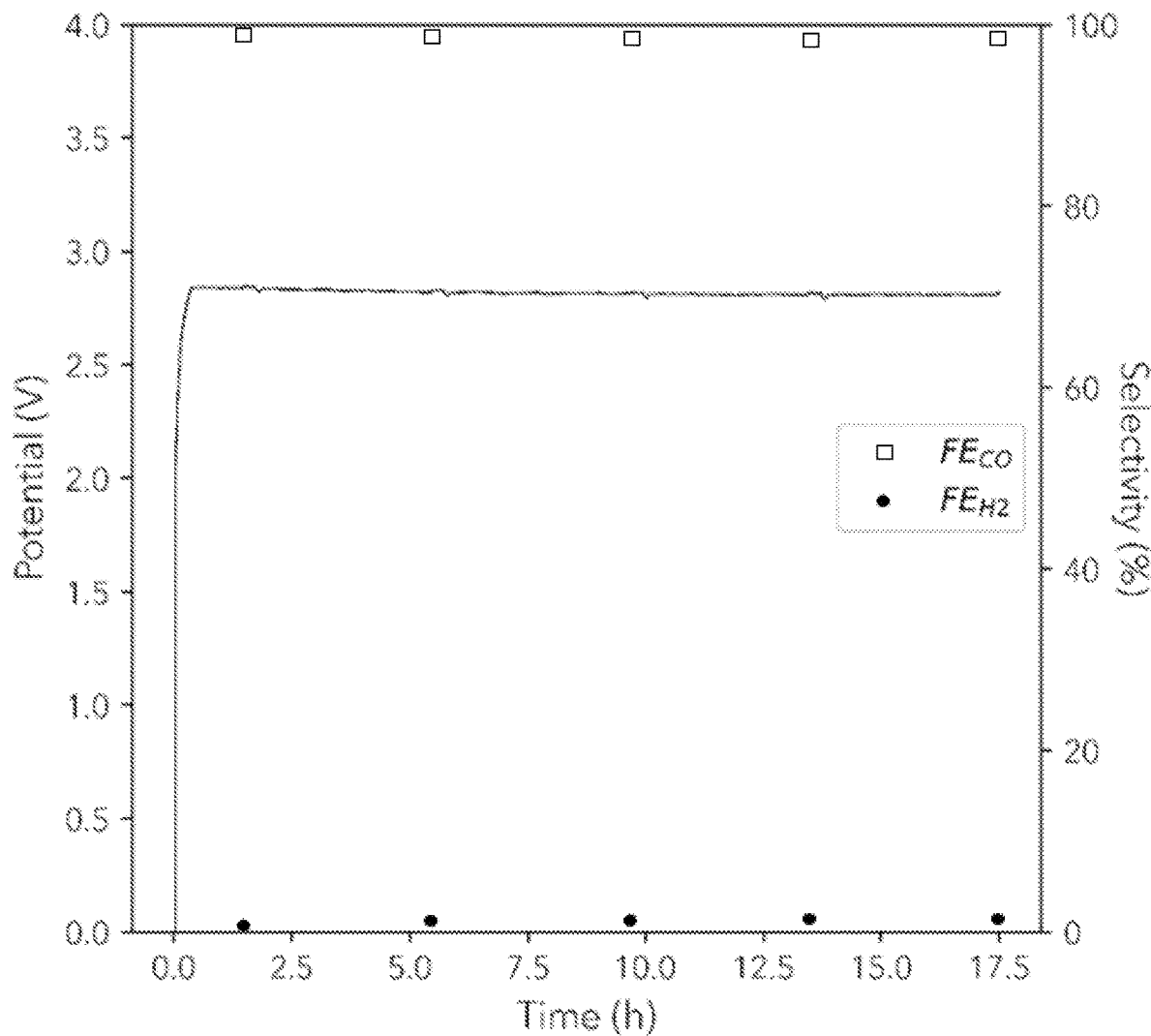
FIG. 7 is a graph showing voltage and FE against time for the conversion of $CO_2$ to CO using the membrane M1.8, electrolysis performed at 5 $cm^2$ cell scale operating at 200 $mA/cm^2$.
Figure 8:
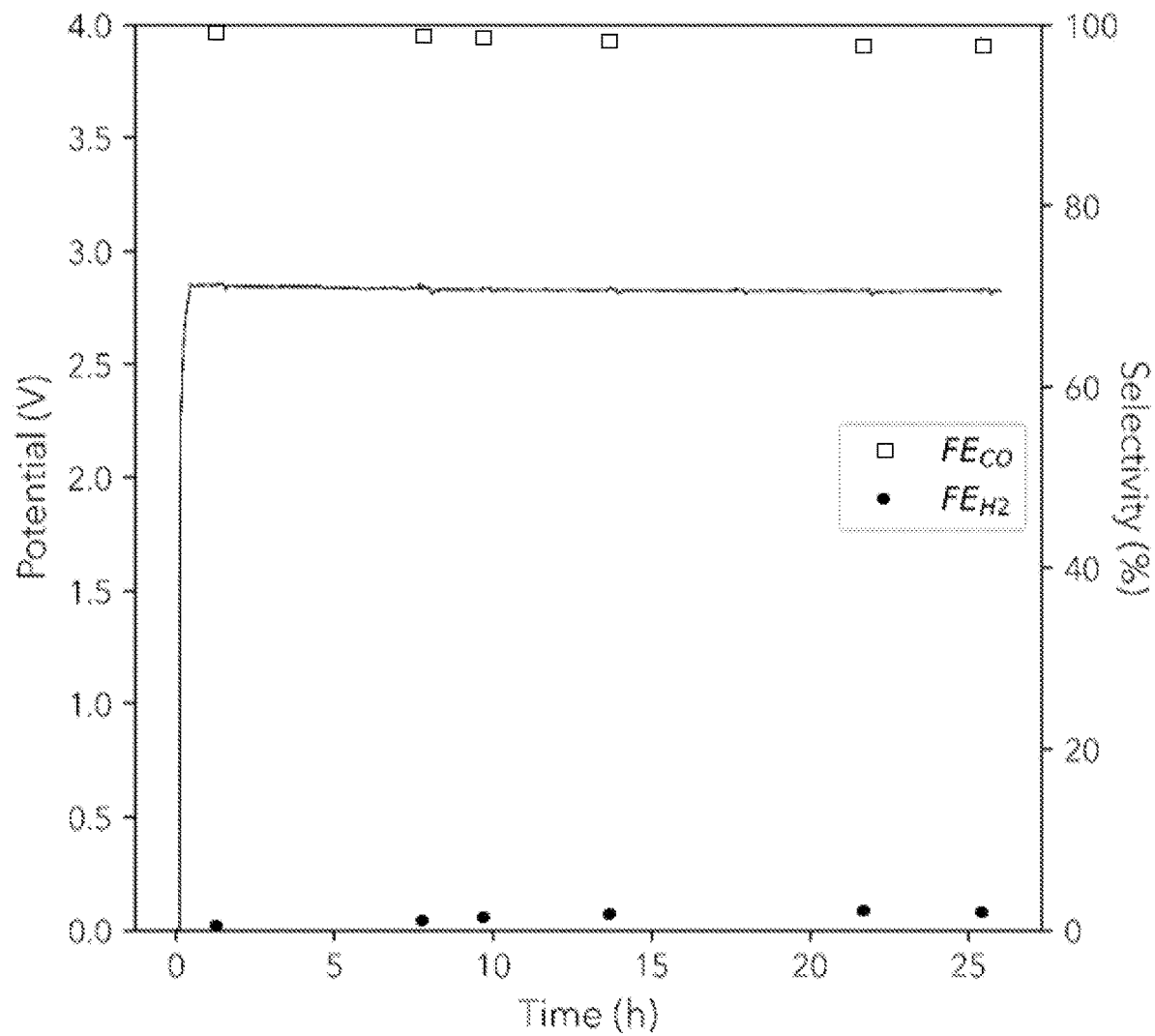
FIG. 8 is a graph showing voltage and FE against time for the conversion of $CO_2$ to CO using the membrane M1.9, electrolysis performed at 5 $cm^2$ cell scale operating at 200 $mA/cm^2$.
Figure 9:
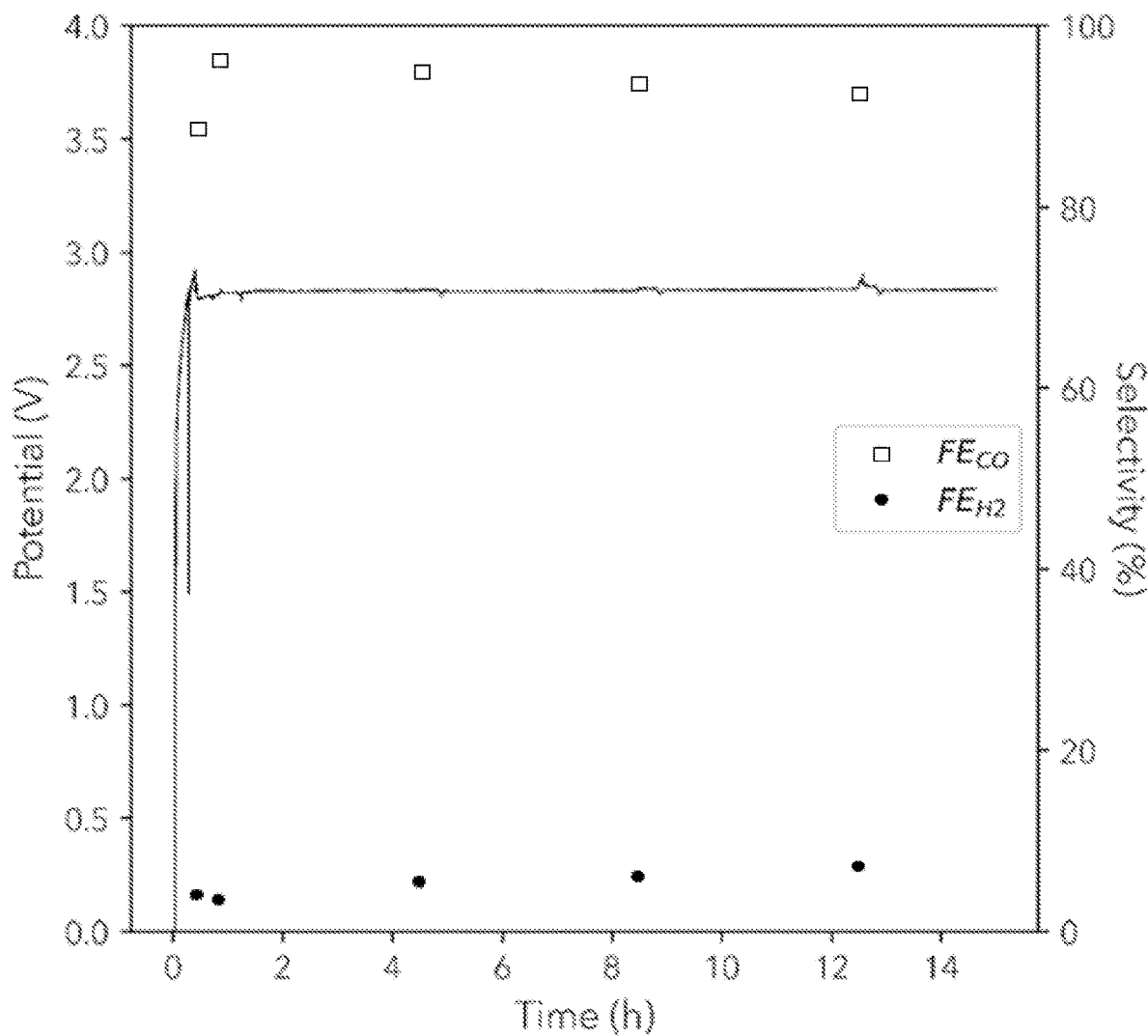
FIG. 9 is a graph showing voltage and FE against time for the conversion of $CO_2$ to CO using the membrane M1.10, electrolysis performed at 5 $cm^2$ cell scale operating at 200 $mA/cm^2$.

In a first aspect, specific embodiments of the invention provide a copolymer comprising first repeat units of an acrylamide moiety and second repeat units of a hydrophobic moiety, wherein the molar ratio of second repeat units:first repeat units is between 0.8:1 to 2.5:1 based on a molar ratio of the respective monomers in a production feed; and optionally further comprising a crosslinker wherein the amount of cross-linker in the corresponding monomer feed is about 0 to about 1 mol %, based on the total monomer in the production feed.

The copolymer described in the first aspect of the invention, and as further defined hereinbelow, may be referred to as "polymers of the invention."

The polymers of the invention may alternatively be depicted as:

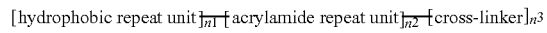

wherein the hydrophobic monomer unit, the acrylamide monomer unit and the cross-linker are as described below; and $n^1$, $n^2$ and $n^3$ are used to describe the ratio of each monomer unit within the polymer composition and are independently selected from any value from (and including) 0 to 1000, such as 0 and 500, such as 0 and 250. The values from 0 to 1000 may be shown to a relevant degree of accuracy, for example, 2 decimal places.

For the avoidance of doubt, the skilled person will understand that references herein to polymers of particular aspects of the invention (such as the first aspect of the invention) will include references to all embodiments and particular features thereof, which embodiments and particular features may be taken in combination to form further embodiments and features of the invention.

Unless indicated otherwise, all technical and scientific terms used herein will have their common meaning as understood by one of ordinary skill in the art to which this invention pertains.

The term "compounds described herein" should be understood to encompass (i) the polymers of the invention and (ii) the monomer units described herein.

Compounds of the invention may contain double bonds and, unless otherwise indicated, may thus exist as E (entgegen) and Z (zusammen) geometric isomers about each individual double bond. Unless otherwise specified, all such isomers and mixtures thereof are included within the scope of the invention.

Compounds of the invention may also exhibit tautomerism. All tautomeric forms and mixtures thereof are included within the scope of the invention (particularly those of sufficient stability to allow for isolation thereof).

For purposes of the disclosure herein, the terms "polymer" and "copolymer" can be used interchangeably. As used herein, the term "polymer" or "copolymer" refers both to a material collected as the product of a polymerisation reaction.

Unless otherwise specified, $C_{1-z}$ alkyl groups (where z is the upper limit of the range) defined herein may be straight-chain or, when there is a sufficient number (i.e., a minimum of two or three, as appropriate) of carbon atoms, be branched-chain, and/or cyclic (so forming a $C_{3-z}$ cycloalkyl group). When there is a sufficient number (i.e., a minimum of four) of carbon atoms, such groups may also be part cyclic (so forming a $C_{4-z}$ partial cycloalkyl group). For example, cycloalkyl groups that may be mentioned include cyclopropyl, cyclopentyl and cyclohexyl. Similarly, part cyclic alkyl groups (which may also be referred to as "part cycloalkyl" groups) that may be mentioned include cyclopropylmethyl. When there is a sufficient number of carbon atoms, such groups may also be multicyclic (e.g. bicyclic or tricyclic) and/or spirocyclic. For the avoidance of doubt, particular alkyl groups that may be mentioned include straight chain (i.e., not branched and/or cyclic) alkyl groups.

Unless otherwise specified, $C_{2-z}$ alkenyl groups (where z is the upper limit of the range) defined herein may be straight-chain or, when there is a sufficient number (i.e., a minimum of three) of carbon atoms, be branched-chain, and/or cyclic (so forming a $C_{4-z}$ cycloalkenyl group). When there is a sufficient number (i.e., a minimum of five) of carbon atoms, such groups may also be part cyclic. For example, part cyclic alkenyl groups (which may also be referred to as "part cycloalkenyl" groups) that may be mentioned include cyclopentenylmethyl and cyclohexenylmethyl. When there is a sufficient number of carbon atoms, such groups may also be multicyclic (e.g., bicyclic or tricyclic) or spirocyclic. For the avoidance of doubt, particular alkenyl groups that may be mentioned include straight chain (i.e., not branched and/or cyclic) alkenyl groups.

For the avoidance of doubt, $C_{2-z}$ alkenyl groups, when there is a sufficient number of carbon atoms, may have one or more carbon-carbon double bonds.

For the avoidance of doubt, unless otherwise specified, groups referred to herein as "alkyl", and/or "alkenyl" will be taken as referring to the highest degree of unsaturation in a bond present in such groups. For example, such a group having a carbon-carbon double bond and, in the same group, a carbon-carbon single bond will be referred to as "alkenyl". Alternatively, it may be particularly specified that such groups will comprise only the degree of unsaturation specified (i.e., in one or more bonds therein, as appropriate; e.g., in one bond therein).

For the avoidance of doubt, alkyl and alkenyl groups as described herein may also act as linker groups (i.e., groups joining two or more parts of the compound as described), in which case such groups may be referred to as "alkylene" and "alkenylene", respectively.

For the avoidance of doubt, as used herein, references to heteroatoms will take their normal meaning as understood by one skilled in the art. Particular heteroatoms that may be mentioned include phosphorus, selenium, tellurium, silicon, boron, oxygen, nitrogen and sulphur (e.g., oxygen, nitrogen and sulphur, such as oxygen and nitrogen).

As used herein, the term heterocyclyl may refer to non-aromatic monocyclic and polycyclic (e.g., bicyclic) heterocyclic groups (which groups may, where containing a sufficient number of atoms, also be bridged) in which at least one (e.g., one to four) of the atoms in the ring system is other than carbon (i.e., a heteroatom), and in which the total number of atoms in the ring system is between three and twelve (e.g., between five and ten, such as between three and eight; for example, forming a 5- or 6-membered heterocyclyl group). Further, such heterocyclyl groups may be saturated, forming a heterocycloalkyl, or unsaturated, containing one or more carbon-carbon or, where possible, carbon-heteroatom or heteroatom-heteroatom double and/or triple bonds, forming for example a $C_{2-z}$ (e.g., $C_{4-z}$) heterocycloalkenyl (where z is the upper limit of the range) or a $C_{7-z}$ heterocycloalkynyl group.

For the avoidance of doubt, the skilled person will understand that heterocyclyl groups that may form part of compounds of the invention are those that are chemically obtainable, as known to those skilled in the art. Various heterocyclyl groups will be well-known to those skilled in the art, such as dihydropyranyl, dihydropyridinyl, dihydropyrrolyl (including 2,5-dihydropyrrolyl), dioxolanyl (including 1,3-dioxolanyl), dioxanyl (including 1,3-dioxanyl and 1,4-dioxanyl), dithianyl (including 1,4-dithianyl), dithiolanyl (including 1,3-dithiolanyl), morpholinyl, oxetanyl, oxiranyl, piperazinyl, piperidinyl, pyranyl, pyrazolidinyl, pyrrolidinonyl, pyrrolidinyl, pyrrolinyl, quinuclidinyl, sulfolanyl, 3-sulfolenyl, tetrahydropyranyl, tetrahydrofuryl, tetrahydropyridinyl (such as 1,2,3,4-tetrahydropyridinyl and 1,2,3,6-tetrahydropyridinyl), thietanyl, thiiranyl, thiolanyl, tetrahydrothiopyranyl, thiomorpholinyl, trithianyl (including 1,3,5-trithianyl), tropanyl and the like.

Substituents on heterocyclyl groups may, where appropriate, be located on any atom in the ring system including a heteroatom. Further, in the case where the substituent is another cyclic compound, then the cyclic compound may be attached through a single atom on the heterocyclyl group, forming a spirocyclic compound. The point of attachment of heterocyclyl groups may be via any suitable atom in the ring system, including (where appropriate) a further heteroatom (such as a nitrogen atom), or an atom on any fused carbocyclic ring that may be present as part of the ring system. Heterocyclyl groups may also be in the N- or S-oxidised forms, as is known to those skilled in the art.

At each occurrence when mentioned herein, particular heterocyclyl groups that may be mentioned include 3- to 8-membered heterocyclyl groups (e.g., a 4- to 6-membered heterocyclyl group, such as a 5- or 6-membered heterocyclyl group).

For the avoidance of doubt, references to polycyclic (e.g., bicyclic or tricyclic) groups (for example when employed in the context of heterocyclyl or cycloalkyl groups (e.g., heterocyclyl)) will refer to ring systems wherein at least two scissions would be required to convert such rings into a non-cyclic (i.e., straight or branched) chain, with the minimum number of such scissions corresponding to the number of rings defined (e.g., the term bicyclic may indicate that a minimum of two scissions would be required to convert the rings into a straight chain). For the avoidance of doubt, the term bicyclic (e.g., when employed in the context of alkyl groups) may refer to groups in which the second ring of a two-ring system is formed between two adjacent atoms of the first ring, to groups in which two non-adjacent atoms are linked by an alkyl (which, when linking two moieties, may be referred to as alkylene) group (optionally containing one or more heteroatoms), which later groups may be referred to as bridged, or to groups in which the second ring is attached to a single atom, which latter groups may be referred to as spiro compounds.

Particular heterocyclyl groups that may be mentioned include piperidinyl (e.g., piperidin-1-yl), octahydro-1H-isoindolyl (e.g., octahydro-1H-isoindol-2-yl), azetidinyl (e.g., azetidine-1-yl), oxetanyl (e.g., oxetan-3-yl), morpholinyl (e.g., morpholin-4-yl), piperazinyl (e.g., piperazin-1yl or piperazin-4-yl), azepanyl (e.g., azepan-1-yl), imidazolidinyl (e.g., imidazolidine-2-yl), pyrrolidinyl (e.g., pyrrolidine-1yl), and diazepanyl (e.g., 1,4-diazepan-1-yl).

As may be used herein, the term aryl may refer to $C_{6-14}$ (e.g., $C_{6-10}$) aromatic groups. Such groups may be monocyclic or bicyclic and, when bicyclic, be either wholly or partly aromatic. $C_{6-10}$ aryl groups that may be mentioned include phenyl, naphthyl, 1,2,3,4-tetrahydronaphthyl, indanyl, and the like (e.g., phenyl, naphthyl, and the like). For the avoidance of doubt, the point of attachment of substituents on aryl groups may be via any suitable carbon atom of the ring system.

For the avoidance of doubt, the skilled person will understand that aryl groups that may form part of compounds of the invention are those that are chemically obtainable, as known to those skilled in the art. Particular aryl groups that may be mentioned include phenyl and naphthyl, such as phenyl.

As may be used herein, the term alkyl-aryl may refer to an alkyl species (as already defined herein) directly connected by a carbon-carbon bond to an aryl species (as already defined herein). The point of contact of an alkyl-aryl species to a second species will be through the alkyl group. A $C_{1-z}$ alkyl-aryl group will refer to the number of carbons which form part of the alkyl moiety. For example, benzyl may be referred to as a $C_1$ alkyl-phenyl.

As may be used herein, references to heteroaryl (with may also be referred to as heteroaromatic) groups may refer to 5- to 14- (e.g., 5- to 10-) membered heteroaromatic groups containing one or more heteroatoms (such as one or more heteroatoms selected from oxygen, nitrogen and/or sulphur). Such heteroaryl groups may comprise one, two, or three rings, of which at least one is aromatic. Substituents on heteroaryl/heteroaromatic groups may, where appropriate, be located on any suitable atom in the ring system, including a heteroatom (e.g., on a suitable N atom).

The point of attachment of heteroaryl/heteroaromatic groups may be via any atom in the ring system including (where appropriate) a heteroatom. Bicyclic heteroaryl/heteroaromatic groups may comprise a benzene ring fused to one or more further aromatic or non-aromatic heterocyclic rings, in which instances, the point of attachment of the polycyclic heteroaryl/heteroaromatic group may be via any ring including the benzene ring or the heteroaryl/heteroaromatic or heterocyclyl ring.

For the avoidance of doubt, the skilled person will understand that heteroaryl groups that may form part of compounds of the invention are those that are chemically obtainable, as known to those skilled in the art. Various heteroaryl groups will be well-known to those skilled in the art, such as pyridinyl, pyrrolyl, furanyl, thiophenyl, oxadiazolyl, thiadiazolyl, thiazolyl, oxazolyl, pyrazolyl, triazolyl, tetrazolyl, isoxazolyl, isothiazolyl, imidazolyl, imidazopyrimidinyl, imidazothiazolyl, thienothiophenyl, pyrimidinyl, furopyridinyl, indolyl, azaindolyl, pyrazinyl, pyrazolopyrimidinyl, indazolyl, pyrimidinyl, quinolinyl, isoquinolinyl, quinazolinyl, benzofuranyl, benzothiophenyl, benzoimidazolyl, benzoxazolyl, benzothiazolyl, benzotriazolyl and purinyl.

For the avoidance of doubt, the oxides of heteroaryl/heteroaromatic groups are also embraced within the scope of the invention (e.g., the N-oxide).

As stated above, heteroaryl includes polycyclic (e.g., bicyclic) groups in which one ring is aromatic (and the other may or may not be aromatic). Hence, other heteroaryl groups that may be mentioned include groups such as benzo[1,3]dioxolyl, benzo[1,4]dioxinyl, dihydrobenzo[d]isothiazole, 3,4-dihydrobenz[1,4]oxazinyl, dihydrobenzothiophenyl, indolinyl, 5H,6H,7H-pyrrolo[1,2-b]pyrimidinyl, 1,2,3,4-tetrahydroquinolinyl, thiochromanyl and the like.

Particular heteroaryl groups that may be mentioned include morpholine, piperidine, pyridine, pyrazine, pyridazine, and pyrazole.

For the avoidance of doubt, where a ring is depicted having circle therein, its presence shall indicate that the relevant ring is aromatic. Alternatively, aromatic groups may be depicted as cyclic groups comprising therein a suitable number of double bonds to allow for aromaticity.

For the avoidance of doubt, in cases in which the identity of two or more substituents in a compound of the invention may be the same, the actual identities of the respective substituents are not in any way interdependent. For example, in the situation in which two or more R groups are present (e.g., $R_1$, $R_2$, $R^{y'}$ etc.), those R groups may be the same or different. Similarly, where two or more R groups are present and each represent, for example, $C_{1-20}$ alkyl, the $C_{1-20}$ alkyl groups in question may be the same or different.

Also for the avoidance of doubt, when a term such as "0 to 5" is employed herein, this will be understood by the skilled person to mean 0 and 5, inclusively. Unless otherwise stated, the same reasoning will apply to other such terms used herein.

Further for the avoidance of doubt, when it is specified that a substituent is itself optionally substituted by one or more substituents, the substituents are substituted by one or more selected from the list consisting of the group consisting of halo, $C_{1-6}$ alkyl, aryl, =O, —$OR^e$, —(O)$R^e$, wherein $R^e$ represents H or a $C_{1-10}$ alkyl. These substituents where possible may be positioned on the same or different atoms. Such optional substituents may be present in any suitable number thereof (e.g., the relevant group may be substituted with one or more such substituents, such as one such substituent).

For the avoidance of doubt, the term cyano refers to —CN functional group.

For the avoidance of doubt, where groups are referred to herein as being optionally substituted it is specifically contemplated that such optional substituents may be not present (i.e., references to such optional substituents may be removed), in which case the optionally substituted group may be referred to as being unsubstituted.

The symbol $\sim\!\sim\!\sim$, displayed perpendicular to a bond, indicates the point at which the displayed moiety is attached to the remainder of the molecule.

For the avoidance of doubt, the skilled person will appreciate that compounds of the invention that are the subject of this invention include those that are obtainable, i.e., those that may be prepared in a stable form. That is, compounds of the invention include those that are sufficiently robust to survive isolation, e.g., from a reaction mixture, to a useful degree of purity.

Polymers

In a first embodiment of the first aspect of the invention, a polymer may be an ionic polymer of the following formula:

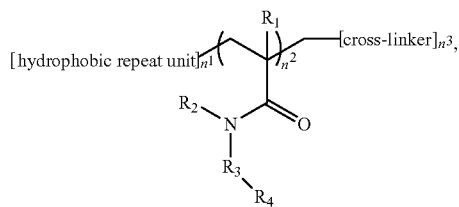

wherein $n^1$, $n^2$, $n^3$, $R_1$, $R_2$, $R_3$ and $R_4$ are as defined herein.

In an embodiment, the acrylamide moiety comprises an ionic substituent.

In a second embodiment of the first aspect of the invention, the polymer may be a non-ionic polymer of the following formula:

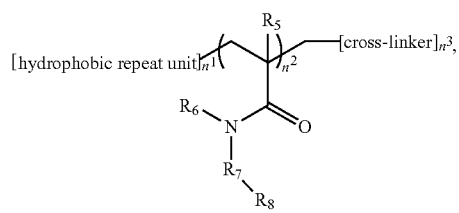

wherein $n^1$, $n^2$, $n^3$, $R_5$, $R_6$, $R_7$ and $R_8$ are as defined herein.

As used herein, the term ionic polymer will be understood to mean a polymer which comprises a cationic moiety as part of the polymer structure and a corresponding counter ion.

In particular embodiments (i.e., particular embodiments of the first embodiment of the first aspect of the invention), the polymer of the invention comprises repeat units of an acrylamide moiety, wherein the acrylamide moiety comprises an ionic substituent.

In a preferred embodiment, the first repeat units of an acrylamide moiety are of formula (I), wherein formula (I) is defined as:

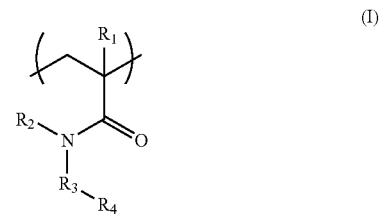

wherein: $R_1$ is selected from the group consisting of: hydrogen, $C_{1-20}$ alkyl, optionally substituted; heterocyclyl, optionally substituted; aryl, optionally substituted; heteroaryl, optionally substituted; and cyano; $R_2$ is selected from the group consisting of hydrogen, $C_{1-20}$ alkyl, optionally substituted; heterocyclyl, optionally substituted; aryl, optionally substituted; a heteroaryl, optionally substituted; and cyano; $R_3$ is a $C_{1-20}$ alkylene, optionally substituted; and $R_4$ is selected from the group consisting of: a quaternary ammonium salt, a quaternary phosphonium salt; and a tertiary sulphonium salt.

In an embodiment, $R_1$ is H or a $C_{1-10}$ alkyl, optionally substituted. In a further particular embodiment, $R_1$ is H or a $C_{1-4}$ alkyl, optionally substituted. In a further particular embodiment, $R_1$ is H or methyl.

In an embodiment, $R_2$ is H, a $C_{1-10}$ alkyl, optionally substituted. In a further particular embodiment, $R_2$ is H or a $C_{1-4}$ alkyl, optionally substituted. In a further particular embodiment, $R_2$ is H or methyl.

In an embodiment, $R_3$ is a $C_{1-10}$ alkylene, optionally substituted. In a further particular embodiment, $R_3$ is a $C_{1-5}$ alkylene, optionally substituted. In a further particular embodiment, $R_3$ is a $C_{2-4}$ alkylene.

For the avoidance of doubt, the terms "quaternary ammonium salt", "quaternary phosphonium salt" and "tertiary sulphonium salt" refer to a quaternary ammonium cation, a quaternary phosphonium cation or a tertiary sulphonium cation, respectively, and a corresponding counter ion. The skilled person will appreciate, that in instances where only a quaternary ammonium cation, quaternary phosphonium salt or tertiary sulphonium salt is described, a corresponding counter ion will also be present, even if not explicitly shown or described.

Where the term ionic polymer is used, the quaternary ammonium salt, a quaternary phosphonium salt, or a tertiary sulphonium salt moiety will be the cationic moiety described above, which forms part of the polymer structure.

In a more particular embodiment, the quaternary ammonium salt is represented by formula (Ia):

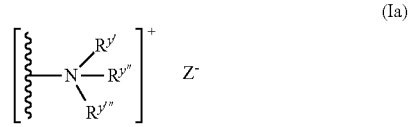

the quaternary phosphonium salt is represented by formula (Ib):

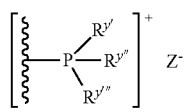

the tertiary sulphonium salt is represented by formula (Ic):

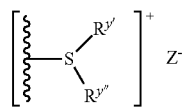

wherein Ry', Ry" and Ry'" are independently selected from the group consisting of: hydrogen; $C_{1-20}$ alkyl, optionally substituted; heterocyclyl, optionally substituted; aryl, optionally substituted; alkyl-aryl, optionally substituted; heteroaryl, optionally substituted; and cyano; wherein $Z^-$ is a counter ion.

In an embodiment, $Z^-$ is an included ionic species in order to maintain electric neutrality of the overall polymer complex.

In a particular embodiment, $Z^-$ is selected from the group consisting of $Cl^-$, $F^-$, $Br^-$, $I^-$, p-tolylsulphonate, methanesulphonate, acetate, benzoate, salicylate, and $R^{z'}CO_2^-$, wherein $R^{z'}$ is a $C_{1-6}$ alkyl.

In a further particular embodiment, $Z^-$ is selected from the group consisting of $Cl^-$, $F^-$, $Br^-$, $I^-$ or $R^{z'}CO_2^-$, wherein $R^{z'}$ is a $C_{1-6}$ alkyl.

In a further particular embodiment, $Z^-$ is $Cl^-$, Br or $I^-$.

In a further particular embodiment, $Z^-$ is selected from the group consisting of $Cl^-$ and $Br^-$.

In a further embodiment, $Z^-$ is $R^{z'}CO_2^-$, wherein $R^{z'}$ is a $C_{1-6}$ alkyl.

In an alternative embodiment, $Z^-$ is selected from the list consisting of $CO_3^{2-}$, $OH^-$, $ClO_4^-$, $IO_4^-$, $SO_4^{2-}$, and $NO_3^-$.

In a further embodiment, Z— is selected from the list consisting of $CO_3^{2-}$ and OH—.

In a further embodiment, Z— is $OH^-$.

In further particular embodiments, Ry', Ry" and Ry'" are independently selected from the group consisting of H, $C_{1-10}$ alkyl, optionally substituted; and $C_{1-10}$ alkyl-aryl.

In further particular embodiments, Ry', Ry" and Ry'" are independently selected from the group consisting of $C_{1-6}$ alkyl; and $C_{1-6}$ alkyl-aryl.

In further particular embodiments, Ry', Ry" and Ry'" are independently selected from the list consisting of methyl, ethyl, n-propyl, n-butyl and benzyl.

In a further embodiment, Ry' and Ry" may be linked together to form, together with the hetero atom to which they are attached, a 4- to 7-membered ring, which ring optionally contains one further heteroatom and which ring optionally is substituted by one or more groups selected from halo and =O.

In an embodiment, $R_4$ is a quaternary ammonium salt of formula (Ia), wherein Ry', Ry" and Ry'" are independently selected from the list consisting of methyl, ethyl, n-propyl, n-butyl and benzyl.

For the avoidance of doubt, groups of cations which are to be covered by the terms quaternary ammonium salt, a quaternary phosphonium salt, or a tertiary sulphonium salt, include, but are not limited to alkylammoniums, arylammoniums, benzylammoniums, imidazoliums, indoliums, pyrazoliums, triazoliums, pyridiniums, azetidiniums, pyrrolidiniums, piperidiniums, azepaniums, alkylphosphoniums, arylphosphoniums, and benzylphosphoniums.

In an embodiment, the ionic acrylamide repeat units are of formula (I), wherein formula (I) is defined as:

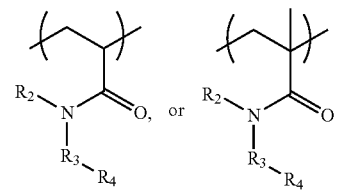

wherein: $R_2$ is H or $C_{1-4}$ alkyl; $R_3$ is $C_{1-4}$ alkyl; and $R_4$ is a quaternary ammonium salt.

Non-Ionic Polymer

In particular embodiments (i.e., particular embodiments of the second embodiment of the first aspect of the invention), the polymer of the invention comprises repeat units of an acrylamide moiety, wherein the acrylamide moiety does not comprise an ionic substituent. These repeat units may be referred to as non-ionic acrylamide repeat units.

In an embodiment, the non-ionic acrylamide repeat units are of formula (II), wherein formula (II) is defined as:

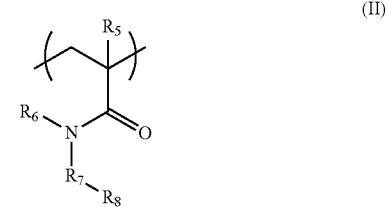

wherein: $R_5$ is selected from the group consisting of hydrogen, $C_{1-20}$ alkyl, optionally substituted; heterocyclyl, optionally substituted; aryl, optionally substituted; heteroaryl, optionally substituted; and cyano; $R_6$ is selected from the group consisting of hydrogen, $C_{1-20}$ alkyl, optionally substituted; heterocyclyl, optionally substituted; aryl, optionally substituted; a heteroaryl, optionally substituted; and cyano; $R_7$ is selected from the groups consisting of hydrogen, and a $C_{1-20}$ alkylene, optionally substituted; and when $R_7$ is hydrogen, $R_8$ is not present; or when $R_7$ is not hydrogen, $R_8$ is selected from the list consisting of —N(Ra')Ra"; —C(O)N(Rb')Rb"; —P(Rc')Rc"; and —S(Rd'), wherein Ra', Ra", Rb', Rb", Rc', Rc" and Rd' are independently selected from the group consisting of hydrogen; halo; $C_{1-20}$ alkyl, optionally substituted; heterocyclyl, optionally substituted; aryl, optionally substituted; alkyl-aryl, optionally substituted; and heteroaryl, optionally substituted; or, alternatively, Ra' and Ra"; or Rb' and Rb"; or Rc' and Rc"; may be linked together to form, together with the hetero atom to which they are attached, a 4- to 7-membered ring, which ring optionally contains one further heteroatom and which ring optionally is substituted by one or more groups selected from halo and =O.

In an embodiment, $R_5$ is H, a $C_{1-10}$ alkyl, optionally substituted. In a further particular embodiment, $R_5$ is H or a $C_{1-4}$ alkyl, optionally substituted. In a further particular embodiment, $R_5$ is H or methyl.

In an embodiment, $R_6$ is H, a $C_{1-10}$ alkyl, optionally substituted. In a further particular embodiment, $R_6$ is H or a $C_{1-4}$ alkyl, optionally substituted. In a further particular embodiment, $R_6$ is H or methyl.

In an embodiment, $R_7$ is a $C_{1-10}$ alkylene, optionally substituted. In a further particular embodiment, $R_7$ is a $C_{1-5}$ alkylene, optionally substituted. In a further particular embodiment, $R_7$ is a $C_{2-4}$ alkylene.

In a further embodiment, Ra', Ra", Rb', Rb", Rc', Rc" and Rd' are independently selected from the group consisting of hydrogen; $C_{1-20}$ alkyl, optionally substituted; and $C_{1-10}$ alkyl-aryl, optionally substituted.

In a further embodiment, Ra', Ra", Rb', Rb", Rc', Rc" and Rd' are independently selected from the group consisting of hydrogen; $C_{1-10}$ alkyl, optionally substituted; and $C_{1-10}$ alkyl-aryl, optionally substituted.

In a further embodiment, Ra', Ra", Rb', Rb", Rc', Rc" and Rd' are independently selected from the group consisting of hydrogen; $C_{1-6}$ alkyl, optionally substituted; and $C_{1-6}$ alkyl-aryl, optionally substituted.

In a further embodiment, Ra', Ra", Rb', Rb", Rc', Rc" and Rd' are independently selected from the group consisting of hydrogen; $C_{1-3}$ alkyl; and $C_{1-3}$ alkyl-aryl, optionally substituted.

In a further embodiment, Ra', Ra", Rb', Rb", Rc', Rc" and Rd' are independently selected from the group consisting of hydrogen, methyl, ethyl, n-propyl, n-butyl and benzyl.

In a further embodiment, Ra', Ra", Rb', Rb", Rc', Rc" and Rd' are independently selected from the group consisting of hydrogen, methyl, ethyl and n-propyl.

In a further embodiment, Ra' and Ra" are linked together to form, a 5- to 6-membered heteroaryl ring, wherein the heteroaryl ring optionally comprises a further nitrogen atom.

In a particular embodiment, $R_8$ is —N(Ra')Ra", wherein Ra' and Ra" are as defined above.

In a further embodiment, $R_8$ is —N(Ra')Ra", wherein Ra' and Ra" are $C_{1-10}$ alkyl, preferably a $C_{1-6}$ alkyl, preferably a $C_{1-3}$ alkyl.

In a further embodiment, $R_8$ is —N(Ra')Ra", wherein Ra' and Ra" are independently selected from H, $C_{1-10}$ alkyl, optionally substituted; $C_{1-6}$ alkyl-aryl, optionally substituted.

In an embodiment, the non-ionic acrylamide repeat units are of formula (II), wherein formula (II) is defined as:

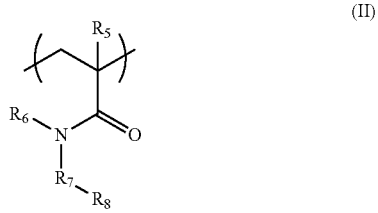

(II)

wherein: $R_5$ is H or methyl; $R_6$ is H; $R_7$ is $C_{1-3}$ alkylene; and $R_8$ is —N(Ra')Ra", wherein Ra' and Ra" are independently selected from H, $C_{1-4}$ alkyl; and $C_{1-3}$ alkyl-aryl.

In a further particular embodiment, the compound of formula (II) is selected from the list consisting of:

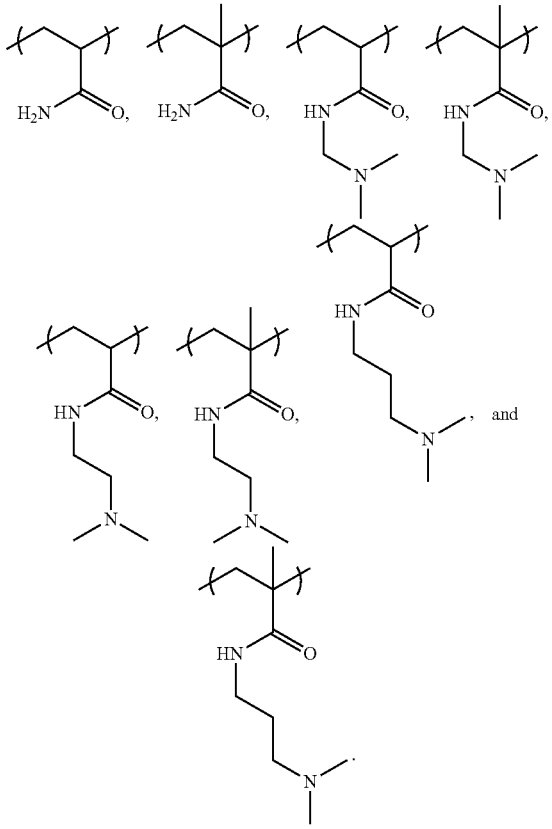

In a particular embodiment, a copolymer may comprise only one type of repeat units of formula (II). For example, each of $R_5$, $R_6$, $R_7$ and $R_8$ are defined the same between each repeat unit of formula (II).

Alternatively, a copolymer may comprise more than one type of repeat units of formula (II). For example, one or more of $R_5$, $R_6$, $R_7$ and $R_8$ are defined differently between each repeat unit of formula (II).

When the copolymer is an ionic copolymer, the copolymer will include at least one type of repeat unit of formula (I). For example, the ionic copolymer may comprise only one type of repeat units of formula (I), or the ionic copolymer may comprise more than one type of repeat units of formula (I), or the ionic copolymer may comprise one or more types of repeat unit of formula (I) and one or more types of repeat unit of formula (II).

Hydrophobic Repeat Unit

In specific embodiments of the invention, the polymer comprises a second repeat unit which is hydrophobic.

The term hydrophobic takes its usual definition in the art, and so refers to a monomer that has a lack of affinity for water and so repels water molecules.

The second repeat unit may be an aromatic or aliphatic repeat unit. For example, the second repeat unit may terminate with an aromatic group or may terminate with an aliphatic group.

It is preferred that the side chain or the first repeat unit complements the side chain of the second repeat unit. For example, where one of Ry', Ry" and Ry'" of the first repeat unit comprises an aryl group, it is preferred that the second repeat unit terminates with an aromatic group.

Furthermore, the second repeat unit may be selected such that the polymerisation method used to polymerise the monomers of the second repeat unit complements the polymerisation method of the first repeat units. For instance, both the first and second repeat units may be polymerised using addition polymerisation techniques.

For the avoidance of doubt, aromatic monomers refer to monomers which comprise an aromatic group. Aromatic monomers may comprise aliphatic sections and aromatic sections.

For the avoidance of doubt, aliphatic monomers refer to monomers which do not comprise an aromatic group.

Without wishing to be bound by theory, it is thought that repeat units which are stable to hydrolysis are advantageous for use as the second repeat units. Therefore, these repeat units are preferred not to comprise ester, ether and/or amide groups.

In an embodiment, the hydrophobic monomer is a selected from the list consisting of: $C_{1-10}$ alkene; and $C_{1-10}$ alkenyl-aryl, wherein the aryl group is optionally substituted with one or more groups selected from the list consisting of $C_{1-4}$ alkyl. Preferably, the double-bond in the alkene is at one of the terminal ends of the carbon chain.

In an embodiment, the second repeat units comprise units comprise an optionally substituted $C_{4-20}$ group pendent from the polymer back-bone.

In an embodiment, the second repeat units are substituted with aromatic or aliphatic groups.

In an embodiment, the second repeat units are of the formula (III), wherein formula (III) is defined as:

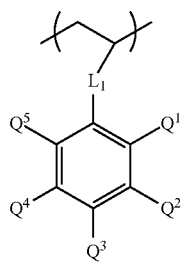

(III)

wherein, $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; and $L_1$ is an optional linker group comprising $C_{1-6}$ alkylene, optionally substituted.

In an embodiment, $L_1$ is $C_{1-6}$ alkylene.

In an embodiment, $L_1$ is $C_{1-3}$ alkylene.

In an embodiment, $L_1$ is —$CH_2$—.

In a preferred embodiment, $L_1$ is not present.

In an embodiment, $Q^1$, $Q^2$, $Q^3$, $Q^4$ and $Q^5$ are independently selected from the list consisting of H, F, methyl, —$CF_3$ and tert-butyl.

In an embodiment, $L_1$ is —$CH_2$—; and $Q^1$, $Q^2$, $Q^3$, $Q^4$ and $Q^5$ are independently selected from the list consisting of H, methyl, F, —$CF_3$ and tert-butyl.

In an embodiment, $Q^1$, $Q^2$, $Q^4$ and $Q^5$ are H and $Q^3$ is selected from the list consisting of methyl, ethyl, n-propyl and n-butyl.

In a particular embodiment, the second repeat unit is an optionally substituted styrene unit.

In a particular embodiment, the second repeat unit is selected from the list consisting of styrene, 4-tert-butylstyrene, 2,3,4,5,6-pentafluorostyrene, 4-(trifluoromethyl)styrene and 2,4,6-trimethylstyrene, In an even more particular embodiment, the second repeat unit is selected from the list consisting of styrene or 4-tert-butylstyrene, Specific Polymer Examples In one embodiment, an ionic polymer comprises:
(i) first repeat units of acrylamide monomer, wherein the acrylamide monomer is defined as:

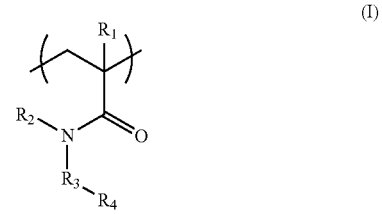

(I)

wherein, $R_1$ is H, $C_{1-10}$ alkyl, optionally substituted, $R_2$ is H, a $C_{1-10}$ alkyl, optionally substituted, $R_3$ is a $C_{1-10}$ alkylene, optionally substituted, and $R_4$ is quaternary ammonium salt is represented by formula (Ia):

(Ia)

wherein Ry', Ry" and Ry'" are independently selected from the group consisting of H, $C_{1-10}$ alkyl, optionally substituted; and $C_{1-10}$ alkyl-aryl; and
(ii) second repeat units of hydrophobic monomer, wherein the hydrophobic monomer is defined as:

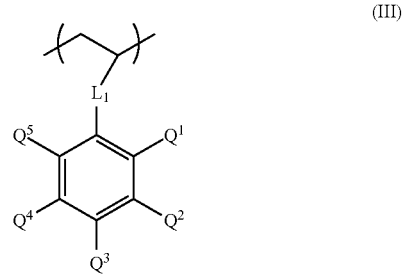

(III)

wherein, $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; and $L_1$ is not present or $C_{1-3}$ alkylene.

In one embodiment, the non-ionic polymer of the present invention comprises:
(i) repeat units of acrylamide monomer, wherein the acrylamide monomer is defined as:

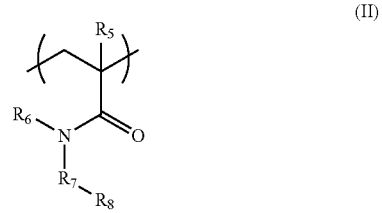

(II)

wherein $R_5$ is H, $C_{1-10}$ alkyl, optionally substituted, $R_6$ is H, a $C_{1-10}$ alkyl, optionally substituted, $R_7$ is a $C_{1-10}$ alkylene, optionally substituted, $R_8$ is —N(Ra')Ra", wherein Ra' and Ra" are independently selected from H, $C_{1-10}$ alkyl, optionally substituted; $C_{1-10}$ alkyl-aryl, optionally substituted; and
(ii) repeat units of hydrophobic monomer, wherein the hydrophobic monomer is defined as:

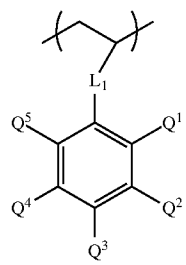

(III)

wherein, $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; and $L_1$ is either not present or a $C_{1-3}$ alkylene.

Ratio of Monomers

The co-polymer comprises repeat units of acrylamide monomer and hydrophobic monomer, wherein the molar ratio of second (hydrophobic) repeat units:first (acrylamide) repeat units in the co-polymer is between 0.8:1 to 2.5:1 based on a molar ratio of the respective monomers in a production feed.

In an embodiment, the co-polymer comprises repeat units of acrylamide monomer and hydrophobic monomer, wherein the molar ratio of second (hydrophobic) repeat units:first (acrylamide) repeat units in the co-polymer is between 1:1 to 2:1, based on the ratio of respective monomers provided to the feed in production.

The preferred molar ratio of hydrophobic monomer repeat units:acrylamide monomer repeat units provided to a production feed will be influenced by the properties of the respective hydrophobic and acrylamide monomers, as would be understood by a person skilled in the art.

The inventors have found that (meth)acrylamide-based polymers which have a very high degree of hydrophilicity tend to provide significant challenges to casting as a membrane. Moreover, such polymers may also lack structural integrity that may be required for adequate function as a membrane. The polymers of the first aspect of the present invention comprise a first (meth)acrylamide repeat unit and a second hydrophobic repeat unit. (Meth)acrylamide groups are hydrophilic, at least by virtue of the amide group.

Furthermore, the inventors have also found that polymers which have a very low degree of hydrophilicity can be too viscous for casting into membranes and, if successfully cast, may suffer from brittleness which can lower the lifetime of a membrane in a cell. Preferred degrees of hydrophilicity are such that a membrane cast from the polymer has a water uptake of from 30 wt % to 200 wt % when measured by:
(i) submerging the membrane in 1M KOH solution for 24 hours
(ii) removing the membrane from the 1M KOH solution, removing excess 1M KOH solution and weighing the membrane in the hydrated state ($W_{wet}$)
(iii) subsequently placing the membrane in a vacuum oven at 70° C. then weighing the membrane in a dehydrated state ($W_{dry}$)
(iv) measuring water uptake (WU) using the following equation:

$$WU = \frac{W_{wet} - W_{dry}}{W_{dry}} \times 100\%$$

The mass of the membranes after it has been wetted with 1M KOH solution, as used in the above method of measurement, were between 0.05 and 0.2 g. The dimensions of the membrane were roughly 4×4 cm. Membranes were submerged in a vast excess of 1M KOH (>100 mL).

As would be understood by a person skilled in the art, structures of monomers in a polymerisation reaction can influence the relative uptake of the respective monomers during a polymerisation reaction. Where tuning of the polymer is required to meet a desired hydrophilicity, lowering the proportion of the first acrylamide moiety in a production feed would be expected to lower the hydrophilicity, while increasing its proportion would increase the hydrophilicity of the polymer.

Chemical properties that might influence the preferred molar ratio of monomers include the hydrophobicity of said monomers, the choice of solvent and/or the presence of a chain transfer agent in the polymerisation mixture.

For instance, the preferred molar ratio of the hydrophobic monomer repeat units acrylamide monomer repeat units in the co-polymer will depend on the chemical and/or physical properties of the hydrophobic and/or acrylamide monomers.

Physical properties that might influence the preferred molar ratio of monomers include the size of the pendent groups, the nature and position of the pendent groups, and the molecular weight (Mw) of the pendent groups. Further, the amount of cross-linking in the final copolymer structure is also thought to influence the water uptake of the polymer membrane. Higher degrees of crosslinking would limit the degree to which a polymer network may swell, thereby limiting its water uptake.

The polymerisation conditions that might influence the preferred molar ratio of the monomers include the temperature of the reaction, the concentration of each monomer in the monomer feed, and the concentration of the initiator used in the monomer feed.

The term pendent group will be understood to mean the part of the monomer repeat unit which does not form part of the polymer backbone.

The skilled person will understand that hydrophobicity may be increased by adding alkyl substituents to a monomer and that this will also influence the proportions of second:first repeat unit monomers provided to a production feed. For instance, when an alkyl substituent is added to a styrene monomer, the substituted styrene monomer will be expected to have a higher hydrophobicity than the unsubstituted styrene monomer.

In this context, unsubstituted styrene refers to the chemical with the IUPAC name ethenylbenzene.

Accordingly, an unsubstituted styrene monomer may form polymeric electrolyte membranes when used to form a polymer with a molar ratio of up to or even above around 2:1 unsubstituted styrene monomer repeat unit:acrylamide monomer repeat unit.

On the other hand, where an alkyl substituted styrene monomer is used, the molar ratio of alkyl substituted styrene monomer repeat unit:acrylamide monomer repeat unit may preferably 1.9:1, preferably 1.8:1, preferably 1.7:1, preferably 1.6:1 in the polymer.

Accordingly, by way of example, when a substituted styrene monomer is used, the molar ratio of acrylamide repeat unit in the polymer is preferred not to be higher than a 1:1 ratio of substituted styrene monomer repeat unit: acrylamide monomer repeat unit.

Without wishing to be bound by any particular theory, the hydrophobicity and/or swellability of the end polymer appears to influence the mechanical properties of a polymer membrane made from said polymer. A polymer which is able to absorb an excessive degree of water and/or swell excessively may have a reduced structural integrity compared to less hydrophilic/swellable polymers. In extreme circumstances, this can affect performance as a membrane.

In a fifth aspect of the invention, an embodiment provides a polymeric membrane comprising repeat units of (i) a hydrophobic monomer, and (ii) an acrylamide monomer wherein the polymeric membrane has a water uptake of from 30 wt % to 200 wt % when measured by the method described above.

In a particular embodiment, there is a polymeric membrane comprising repeat units of (i) a hydrophobic monomer, and (ii) an acrylamide monomer wherein the polymeric membrane has a water uptake of from 30 wt % to 150 wt %.

In a particular embodiment, there is a polymeric membrane comprising repeat units of (i) a hydrophobic monomer, and (ii) an acrylamide monomer wherein the polymeric membrane has a water uptake of from 40 wt % to 150 wt %.

In a particular embodiment, there is a polymeric membrane comprising repeat units of (i) a hydrophobic monomer, and (ii) an acrylamide monomer wherein the polymeric membrane has a water uptake of from 40 wt % to 140 wt %.

In a particular embodiment, there is a polymeric membrane comprising repeat units of (i) a hydrophobic monomer, and (ii) an acrylamide monomer wherein the polymeric membrane has a water uptake of from 50 wt % to 140 wt %.

In a particular embodiment, there is a polymeric membrane comprising repeat units of (i) a hydrophobic monomer, and (ii) an acrylamide monomer wherein the polymeric membrane has a water uptake of from 60 wt % to 90 wt %.

The polymeric membrane of the fifth aspect of the invention described above preferably comprises repeat units of (i) a hydrophobic monomer, and (ii) an acrylamide monomer may be a polymer according to the first aspect of the invention. Additionally or alternatively, it may comprise a cross-linker in an amount between greater than 0 mol % and 1 mol % based on the total monomer in the production feed.

In an embodiment, the polymeric membrane may be formed of the polymer comprising:

(i) an acrylamide monomer repeat unit, wherein the acrylamide monomers are of formula (I), wherein formula (I) is defined as:

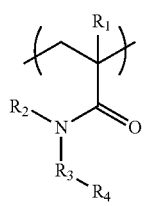

(I)

wherein, $R_1$ is selected from the group consisting of hydrogen, $C_{1-20}$ alkyl, optionally substituted; heterocyclyl, optionally substituted; aryl, optionally substituted; heteroaryl, optionally substituted; and cyano; $R_2$ is selected from the group consisting of hydrogen, $C_{1-20}$ alkyl, optionally substituted; heterocyclyl, optionally substituted; aryl, optionally substituted; a heteroaryl, optionally substituted; and cyano; $R_3$ is selected from, a $C_{1-20}$ alkylene, optionally substituted; and $R_4$ represents a quaternary ammonium salt, a quaternary phosphonium salt, or a tertiary sulphonium salt; and (ii) repeat units of hydrophobic monomer.

In a particular embodiment, the repeat units of hydrophobic monomer are of the formula (III), wherein formula (III) is defined as:

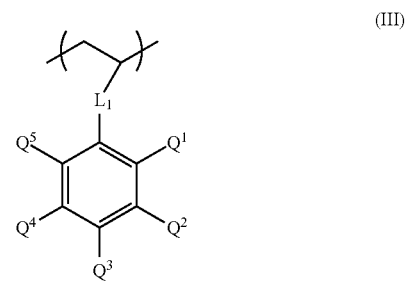

(III)

wherein, $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; and $L_1$ is optional or is $C_{1-6}$ alkylene; preferably $C_{1-6}$ alkylene; preferably —$CH_2$—.

In an embodiment, the polymeric membrane may be formed of the polymer comprising:

(i) repeat units of acrylamide monomer, wherein the acrylamide monomer is defined as:

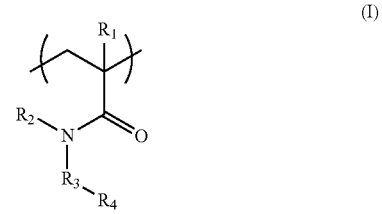

(I)

wherein, $R_1$ is H, $C_{1-10}$ alkyl, optionally substituted, $R_2$ is H, a $C_{1-10}$ alkyl, optionally substituted, $R_3$ is a $C_{1-10}$ alkylene, optionally substituted, and $R_4$ is quaternary ammonium salt is represented by formula (Ia):

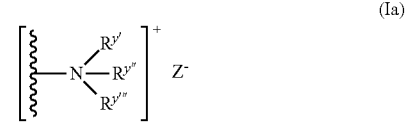

(Ia)

wherein Ry', Ry" and Ry''' are independently selected from the group consisting of H, $C_{1-10}$ alkyl, optionally substituted; and $C_{1-10}$ alkyl-aryl; and (ii) repeat units of hydrophobic monomer, wherein the hydrophobic monomer is defined as:

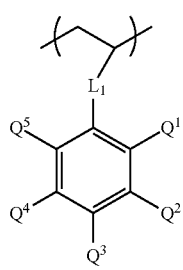
(III)

wherein, $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; and $L_1$ is not present or is $C_{1-3}$ alkylene.

In an embodiment, the membranes have a single layer casting thickness of between 10 to 1000 μm, preferably 50 to 500 μm, preferably 50 to 200 μm, preferably 75 to 175 μm.

Cross-Linker

The polymers disclosed herein may optionally include a cross-linker.

As used herein, crosslinking monomers are defined as monomers containing two or more groups that can be polymerised by addition polymerization. Cross-linker monomers may be selected from the following chemical classifications: vinyls, styrenes, acrylates, methacrylates, acrylamides, and methacrylamides.

One or more crosslinking comonomers may be combined with the cationic acrylamide monomer.

One or more crosslinking comonomers may be used. When more than one cross-linker is used, the cross-linkers may be selected from the same crosslinking monomer classification or a different cross-linking monomer classification.

In an embodiment, the cross-linker comprises two or more halide atoms.

In an embodiment, the copolymer of the present invention comprises a cross-linker selected from the list consisting of divinylbenzene, 4,4'-Bis(chloromethyl)-1,1'-biphenyl, or bis-(meth)acrylamide.

In a more particular embodiment, the cross-linker is divinylbenzene, preferably, 1,4-divinylbenzene.

The cross-linker may be added post-polymerisation. Cross-linkers suitable for this purpose include 1,4-dibromobutane and pentaerythrityl tetrabromide.

Overall Ratios

The amount of cross-linker is described as the amount of cross-linker added to the corresponding monomer feed. That is, the monomer feed which comprises (i) the hydrophobic monomer, (ii) the acrylamide monomer, and (iii) the cross-linker (as well as any other monomers which may be present). Preferred quantities of cross-linker may be less than 0.75 mol % or less than 0.5 mol % of the monomer feed.

The monomer feed may also be described as the co-monomer feed, the co-monomer mixture or the polymer pre-mix. Each term will be understood to mean the mixture comprising each of the components (i) the hydrophobic monomer, (ii) the acrylamide monomer, and (iii) the cross-linker before a polymerisation step takes place.

The composition of the monomer feed will influence the composition of the final copolymer. For instance, a monomer feed comprising a monomer feed molar ratio of [hydrophobic monomer]:[acrylamide monomer]:[cross-linker] of 125:75:0.25 will be expected to subsequently polymerise and form a copolymer with increased hydrophobic content than if the monomer feed ratio of [hydrophobic monomer]: [acrylamide monomer]: [cross-linker] were 100:100:0.25.

In an embodiment, a copolymer may be depicted as:

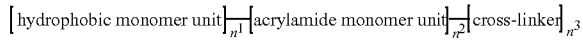

wherein $n^1$, $n^2$ and $n^3$ represent the number of repeat units in the final copolymer. For example, $n^1$ may be 125, $n^2$ may be 75 and $n^3$ may be 0.25.

For the avoidance of doubt, the above depiction of the copolymer is not necessarily limited to a block co-polymer structure. The skilled person will appreciate that the above depiction represents a simplified illustration of a polymer.

The optimal amount of cross-linker to be added to the corresponding monomer feed will be dependent on the specific nature of the hydrophobic and acrylamide monomers. For instance, the optimal amount of cross-linker will depend on the chemical and/or physical properties of the hydrophobic and/or acrylamide monomers.

The skilled person will also appreciate that (i) the number of polymerizable groups present in the monomer feed, (ii) the type of polymerizable functional group (e.g., styrene, acrylamide etc.) and (iii) the concentration of polymer in solution will affect the amount of cross-linker needed in order to achieve a suitable degree of cross-linking in the final polymer structure. In general, it has been found that if a polymer may be too viscous in solution to be worked into a membrane, either the quantity of crosslinker in the monomer feed could be reduced or the ratio of second repeat unit to first repeat unit in the monomer feed could be increased.

Ratios of second repeat unit:first repeat unit may preferably be between about 2:1 and about 0.9:1, for example between about 1:1 and about 1.8:1, based on the molar ratio of the respective monomers in a production feed.

The amount of cross-linker will alter the physical properties of a polymer membrane made from the polymers as described herein. In particular, the mechanical properties. The resulting modification of mechanical properties depends strongly on the cross-link density.

Polymer membranes formed of polymers with a higher degree of cross-linking will be more rigid than the same polymer with a lower degree of cross-linking.

However, alternatively, the monomers making up the polymer structure may be changed instead of the amount of cross-linker in order to control the mechanical properties of the resulting polymer membrane.

As is discussed above, the polymers disclosed herein can form membranes which have surprising utility in aqueous conditions and applications such as in the electrolysis of carbon dioxide, carbon monoxide and/or water.

In order to achieve a polymer that is suitable for producing polymer membranes suitable for use in these applications, the maximum and minimum amount cross-linker added to the corresponding monomer feed will be dependent on the specific nature of the hydrophobic and acrylamide monomers.

For instance, when a substituted hydrophobic monomer is used, less cross-linker is required in order to make membranes suitable for the above-mentioned applications, when compared to the same polymer system comprising the corresponding unsubstituted monomer.

For example, when a substituted styrene monomer repeat unit is used, less cross-linker is required than when an unsubstituted styrene monomer repeat unit is used.

In this context, unsubstituted styrene refers to the chemical with the IUPAC name ethenylbenzene.

In this context, substituted styrene refers to a repeat unit of formula (III),

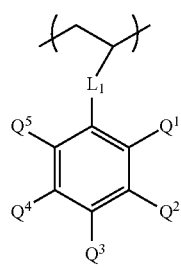

wherein $L_1$ is not present; and $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; wherein at least one of $Q^1$, $Q^2$, $Q^3$, $Q^4$ and $Q^5$ is not H.

The maximum and minimum amount of cross-linker that may be added to the corresponding monomer feed will also be dependent on the ratio of hydrophilic to acrylamide monomers present in the monomer feed (and so the ratio of hydrophilic to acrylamide monomers present in the final polymer structure).

The purpose of the cross-linker is to create covalent bonds between the copolymer chains. These covalent bonds result in polymers with improved mechanical stability in comparison to the corresponding, non-crosslinked polymer.

In an embodiment, a cross-linker is not present in the polymers disclosed herein.

Due to the copolymer comprising hydrophobic monomer units and acrylamide monomer units, the ratio of hydrophobic monomer:acrylamide monomer may be tailored so that the interactions between the hydrophobic units and the acrylamide units are sufficient to create a polymer with sufficient membrane stability. In these situations, a cross-linker need not be present in order to form a polymer which can form a membrane suitable for use in aqueous conditions and applications such as in the electrolysis of carbon dioxide, carbon monoxide and/or water.

Mw

In one embodiment, the polymers disclosed herein have a molecular weight (Mw) between 1,000 and 1,000,000 g/mol, notably between 10,000 and 1,000,000 g/mol, preferably between 25,000 and 500,000 g/mol, when measured using gel permeation chromatography.

The skilled person would understand how to modify the molecular weight of the polymer in order to produce a polymer with mechanical integrity and which can be used for the applications and purposes described herein.

For example, increasing the initiator concentration and/or using a chain transfer agent may be used to modify the chain length and molecular weight of the polymer.

In an embodiment, the polymerisation step may be performed by any addition polymerisation technique, for example, free-radical addition polymerisation.

In an embodiment, the polymers disclosed herein have a configuration selected from the list consisting of random, gradient, alternating, graft and block.

In an embodiment, the polymers disclosed herein have a configuration selected from the list consisting of linear, graft, comb, star, dendritic, block, block star, branched, hyperbranched, and circular.

Method of the Polymer

In the ninth aspect, embodiments provide a method of forming the copolymer described herein, the method comprising forming a first polymer by:
  a. mixing a first monomer and a second monomer and an optional crosslinker wherein the molar ratio of the second monomer:first monomer is between 0.8:1 to 2.5:1 and the amount of cross-linker is about 0 to about 1 mol %, based on the total amount of monomer present; and
  b. initiating a polymerisation;
wherein the first monomer comprises an acrylamide moiety and the second monomer is hydrophobic.

In embodiments of the invention, ratios of second monomer:first monomer may preferably be between about 2:1 and about 0.9:1, for example, between about 1:1 and about 1.8:1, based on the molar ratio of the respective monomers.

In a particular embodiment, the first monomer is of formula (IIa), wherein formula (IIa) is defined as:

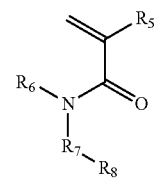

wherein: $R_5$ is selected from the group consisting of hydrogen, $C_{1-20}$ alkyl, optionally substituted; heterocyclyl, optionally substituted; aryl, optionally substituted; heteroaryl, optionally substituted; and cyano; $R_6$ is selected from the group consisting of hydrogen, $C_{1-20}$ alkyl, optionally substituted; heterocyclyl, optionally substituted; aryl, optionally substituted; a heteroaryl, optionally substituted; and cyano; and $R_7$ is selected from the group consisting of hydrogen, a $C_{1-20}$ alkylene, optionally substituted; wherein when $R_7$ is hydrogen, $R_8$ is not present; or when $R_7$ is not hydrogen, $R_8$ selected from —N(Ra')Ra"; —C(O)N(Rb')Rb"; —P(Rc')Rc"; —S(Rd'); wherein Ra', Ra", Rb', Rb", Rc', Rc" and Rd' are independently selected from the group consisting of hydrogen; halo; $C_{1-20}$ alkyl, optionally substituted; heterocyclyl, optionally substituted; aryl, optionally substituted; alkyl-aryl, optionally substituted; and heteroaryl, optionally substituted; or, alternatively, Ra' and Ra"; or Rb' and Rb"; or Rc' and Rc"; may be linked together to form, together with the hetero atom to which they are attached, a 4- to 7-membered ring, which ring optionally contains one further heteroatom and which ring optionally is substituted by one or more groups selected from halo and =O.

In an embodiment, the hydrophobic second monomer has a structure of formula (IIIa):

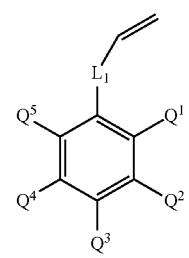

wherein $Q^1$, $Q^2$, $Q^3$, $Q^4$ and $Q^5$ are independently selected from the list consisting of H, F, methyl, ethyl, n-propyl, i-propyl, —$CF_3$, n-butyl and t-butyl; and $L_1$ is an optional linker group of $C_{1-6}$ alkylene, optionally substituted. In some embodiments, $Q^1$, $Q^2$, $Q^3$, $Q^4$, $Q^5$ and $L_1$ are as described above in relation to embodiments of the polymer.

In an embodiment, polymerised ionic repeat units of formula (I) may be formed by a method comprising reacting polymerised non-ionic repeat units of formula (II) with a molecule of the formula $X^L$-$R_9$ wherein $X^L$ is a leaving group; and $R_9$ is selected from the group consisting of hydrogen; an alkyl, optionally substituted; an aryl, optionally substituted; an alkyl-aryl, optionally substituted; and heteroaryl, optionally substituted.

In further particular embodiments, $R_9$ is selected from the group consisting of $C_{1-20}$ alkyl, optionally substituted; heterocyclyl, optionally substituted; aryl, optionally substituted; alkyl-aryl, optionally substituted; and heteroaryl, optionally substituted.

In further particular embodiments, $R_9$ is selected from the group consisting of $C_{1-10}$ alkyl, optionally substituted; $C_{1-6}$ alkyl-aryl, optionally substituted.

In particular embodiments, $R_9$ is methyl, ethyl, n-propyl, n-butyl and benzyl.

As described herein, the term "leaving group" takes its usual definition in the art and so refers to an atom or group of atoms that detaches from the main or residual part of a substrate during a reaction or elementary step of a reaction.

In particular embodiments, $X^L$ is a halide or a sulfonate ester.

In particular embodiments, $X^L$ is elected from the list consisting of chloride, bromide, iodide or tosylate (TsO—).

In a further particular embodiment, $X^L$ is selected from the list consisting of chloride, bromide and iodide, preferably chloride or bromide.

In an embodiment, $X^L$-$R_9$ is defined such that $R_9$ is selected from the group consisting of $C_{1-10}$ alkyl, optionally substituted; 6-membered $C_{1-6}$ alkyl-aryl, optionally substituted.

In a particular embodiment, $X^L$-$R_9$ is selected from the list consisting of methyl bromide, ethyl bromide, n-propyl bromide, n-butyl bromide or benzyl bromide.

The skilled person will understand that molecule of formula $R_9$ will react with the heteroatom (e.g., N, S, P) at the terminus side of the acrylamide monomer repeat unit. As a result, the $R_9$ moiety will attach directed to the hetero atom at the terminus. Consequently, when nitrogen, phosphorus or sulphur is the heteroatom, a quaternary ammonium salt, a quaternary phosphonium salt, or a tertiary sulphonium salt will be formed, respectively.

Therefore, when the quaternary ammonium salt is represented by formula (Ia):

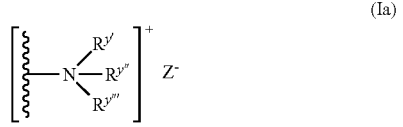

(Ia)

the quaternary phosphonium salt is represented by formula (Ib):

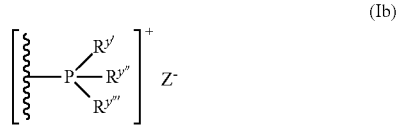

(Ib)

or the tertiary sulphonium salt is represented by formula (Ic):

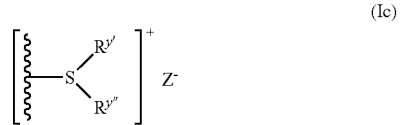

(Ic)

wherein one of Ry' or Ry" will be the $R_9$ from the compound $X^L$-$R_9$.

An example of this reaction is shown in example 2, below.

While, in one embodiment, the ionic polymer of formula (I) may be formed by a method comprising reacting a polymer of formula (II) with a molecule of the formula $X^L$—$R_9$, in an alternative embodiment, a polymer of formula (I) may be formed by reacting the unpolymerised acrylamide monomer unit with a molecule or the formula $X^L$-$R_9$.

Polymer Membrane

In the second and fifth aspects, there is a membrane comprising the polymers described herein.

In an embodiment, there is a membrane comprising an ionic copolymer in accordance with the ionic copolymers disclosed herein.

In an embodiment, membranes may be prepared from the polymers disclosed herein by one or more of the following techniques selected from the list consisting of: non-solvent induced phase separation, vapor-induced phase separation, electrospinning, track etching and sintering.

In an embodiment, the membranes of the second and fifth aspects may be cast from solutions wherein the polymers disclosed herein are dissolved in a suitable solvent or a solvent mixture.

The maximum concentration of the polymer in the solution will be determined by the resulting viscosity. For instance, when the concentration of the polymer is too high, the resulting solution will become too viscous to handle.

In an embodiment, the solution comprising the polymers disclosed herein is cast onto an inert substrate, such as glass, and a film applicator is passed over the solution at a defined height to prepare to membrane at an equivalent wet thickness. Membranes can be subsequently dried by heating and/or reduced pressure.

In an alternative embodiment, the solution comprising the polymers disclosed herein is cast on top of a supporting material, instead of an inert substrate. In this embodiment, the supporting material becomes part of the membrane and is not removed during the activation step of the membrane. Supporting material can include any natural, synthetic or semi-synthetic polymers. Synthetic polymers can include any polymers prepared by addition or step-growth polymerization.

In an alternative embodiment, the solution comprising the polymers disclosed herein is cast directly onto an anode and/or cathode. The anode and/or cathode may then subsequently form part of a membrane electrode assembly (MEA). The resulting membrane will remain adhered to the electrode(s) surface during membrane activation if activation is required.

When casting the polymer membranes, the membrane thickness may be controlled using an adjustable doctor blade.

In an embodiment, the polymer membranes have casting thickness (the thickness that the polymer membrane are cast at) of between 10 and 1000 µm. The casting thickness is determined by using a film applicator which has a micrometre screw for adjusting the height of the applicator above the substrate surface.

Prior to using the polymer membranes disclosed herein in an application, the polymer membrane may undergo an activation step. The resulting polymer membranes may therefore be referred to as activated polymer membranes.

Typically, the activation step takes place on an ionic polymer membrane as disclosed herein.

In an embodiment, the activated polymer membrane is formed by contacting a membrane comprising a polymer as disclosed herein with an ionic salt solution.

The step of contacting a membrane comprising a polymer as disclosed herein with an ionic salt solution may also be referred to as a hydration step or as an activation step.

In a further embodiment, the ionic salt solution is a metallic salt solution, wherein the term metallic salt solution refers to a salt wherein the cation aspect of the salt is of the form Mn+, wherein M is a metal and n is a number selected from the list consisting of 1, 2 or 3.

In a further embodiment, the ionic salt solution is an alkali metal salt solution.

In a further embodiment, the ionic salt solution comprises one or more of the cations selected from the list consisting of $Li^+$, $K^+$, $Na^+$, $Cs^+$, $Rb^+$ and $Fr^+$.

In a preferred embodiment, the ionic salt solution comprises one or more of the cations selected from the list consisting of $Li^+$, $K^+$, and $Na^+$.

In a further embodiment, the ionic salt solution comprises an anion selected from the list consisting of $CO_3^{2-}$, $OH^-$, $ClO_4^-$, $IO_4^-$, $SO_4^{2-}$, and $NO_3^-$.

In a further embodiment, the ionic salt solution is selected from the list consisting of lithium hydroxide (LiOH), potassium hydroxide (KOH), potassium carbonate ($K_2CO_3$), potassium sulphate ($K_2SO_4$), potassium nitrate ($KNO_3$), sodium hydroxide (NaOH), sodium carbonate ($Na_2CO_3$), sodium sulphate ($Na_2SO_4$) and sodium nitrate ($NaNO_3$).

In a further embodiment, the ionic salt solution is potassium hydroxide.

The activation step carried out on the ionic polymer membranes disclosed herein (e.g., the contacting of the ionic membrane with an ionic salt solution) has three purposes:
(i) to exchange any halide counterion associated with the polymer membranes with a non-halide counterion (preferably $OH^-$ or $CO_3^{2-}$);
(ii) to allow the dry membrane to swell with water; and
(iii) to remove the membrane from the casting substrate.

The halide counterion is exchanged with a non-halide counterion, in order to ensure that no halides are present prior to using the polymer membranes for electrolysis and so that the counterion is similar to the ion transported across the membrane during electrolysis.

The polymer membranes are hydrated with water prior to using the polymer membranes for electrolysis.

In an embodiment, the activated polymer membranes have wet thickness of between 10 and 1000 μm. The wet thickness is the thickness of the activated polymer membrane (e.g., the thickness of the polymer membrane after it has been contacted with an ionic salt solution). The wet thickness is determined by using a film applicator which has a micrometer screw for adjusting the height of the applicator above the substrate surface.

The activated membranes may also be stored in the ionic salt solution used for the activation step until said membranes are ready to be used.

Uses of the Polymer Membrane

In one aspect, the polymer membranes disclosed herein have applications in ionic systems.

In another aspect, polymer membranes comprising polyacrylamides have applications in ionic systems.

The polymer membranes disclosed herein have a particular use in electrical chemical processes that require the transportation of ionic species. Such applications include the electrolysis of carbon dioxide, carbon monoxide and/or water.

In an embodiment, the polymer membranes disclosed herein may be polymeric electrolyte membranes.

In an embodiment, the polymer membranes disclosed herein may be ionic exchange membranes.

In an embodiment, the polymer membranes disclosed herein may be anionic exchange membranes (AEM).

In an embodiment, the polymer membranes disclosed herein may be cationic exchange membranes (CEM).

In an embodiment, the polymer membranes disclosed herein may be bipolar membranes (BPM).

The exact nature of the polymer membrane (AEM, CEM or BPM) will depend on the polymer functionality which makes up the membrane.

The polymers described herein comprising an acrylamide monomer repeat unit of formula (I) form AEMs.

AEMs are positively charged macromolecules. Cationic groups can exist as side groups along the length or part of the polymer backbone, moreover the cationic group may form part of a polymeric backbone.

When polymers comprising acrylamide monomer repeat units of formula (I) are made into membranes, the cationic functionality comes from the side groups extending from the polymer backbone. For example, in the form of a quaternary ammonium salt, a quaternary phosphonium salt, or a tertiary sulphonium salt.

AEMs are primarily employed to facilitate the transport of anions ($OH^-$, $CO_3^{2-}$, $Cl^-$, etc.) across an electrochemical cell from cathode to anode. The species of anion and product formed after transportation will vary according to the application. Other than the transportation of anions, AEMs are expected to prevent the crossover of product and/or reactant, as well as manage the transport of water if present. For AEMs to show optimal performance they must be mechanically, chemically and thermally stable over long durations.

In the third aspect, there is a polymer electrolyte membrane comprising a membrane comprising one or more of the copolymers described herein, such as a membrane of the second or fifth aspects of the invention.

In an embodiment, the polymer electrolyte membrane has a single layer casting thickness of between 10 to 1000 μm, preferably 50 to 500 μm, preferably 50 to 200 μm, preferably 75 to 175 μm.

In the fourth aspect, there is a polymer electrolyte membrane comprising a plurality of membranes comprising one or more copolymers described herein.

In the sixth aspect, an embodiment provides an electrolytic cell comprising an anode, a cathode and a membrane positioned therebetween, wherein the membrane comprises a polymer electrolyte membrane according as described above.

In the seventh aspect, an embodiment provides a method of electrolysis comprising:
a. providing an electrolytic cell of the fifth aspect;
b. supplying a reaction fluid comprising COx or $H_2O$ to the cathode;
c. applying a first voltage across the anode and cathode;
d. collecting an electrochemical reaction product.

In some embodiments, the membrane comprises a laminate of a plurality of membranes as described above.

It is preferred that the method comprises applying a potential of less than 4 V across the anode and cathode.

In embodiments, the potential applied across the anode and cathode provides a current per unit area through the membrane of greater than 10 mA/cm$^2$. It is preferred that the potential applied across the anode and cathode provides a current per unit area through the membrane of greater than 150 mA/cm2 or more preferably greater than 200 mA/cm$^2$.

In an embodiment, the reaction fluid comprises $CO_2$ and the electrochemical reaction product comprises CO. Preferably this involves the production of a reaction product with a Faradaic efficiency of at least 10% (more preferably at least 20%, 40%, 60%, 80% or 90% CO).

In an embodiment, the reaction fluid comprises CO and the electrochemical reaction product comprises one or more organic reaction products selected from the list consisting of ethylene, acetate, ethanol and formate. Preferably this involves the production of a reaction product with a Faradaic efficiency of at least 10% (more preferably at least 20%, 40%, 60%, 80% or 90%).

When the electrochemical reaction product comprises acetate and/or formate, the acetate and formate are present in their ionic forms. The skilled person will appreciate that the precise salt of the acetate and formate salts that would be produced will depend on the cations present in the anolyte.

In an embodiment, the reaction fluid comprises $H_2O$ and the electrochemical reaction product comprises Hz. It is preferred that the method comprises applying a potential of less than 4 V across the anode and cathode.

In any method or use as described above, it is preferred that the voltage applied across the anode and cathode is at least 1.2 V, for example at least 1.4 V.

EXAMPLES

List of Abbreviations

St Styrene
tBSt 4-tert-Butylstyrene
DMAPMA N-[3-(Dimethylamino)propyl]methacrylamide
MAPDMBAB [3-(Methacryloylamino)propyl]dimethylbutylammonium bromide
MAPDMBAC [3-(Methacryloylamino)propyl]dimethylbenzylammonium chloride
DVB Divinylbenzene
AIBN 2,2'-Azobis(2-methylpropionitrile)
DMF N,N-Dimethylformamide
DMSO Dimethyl sulfoxide
BrBu 1-Bromobutane
BzCl Benzyl chloride
WU Water uptake
IEC Ionic exchange capacity
NMR Nuclear magnetic resonance
MEA Membrane electrode assembly
FE Faradaic efficiency Example 1: Copolymerization of tBSt, DMAPMAm and DVB

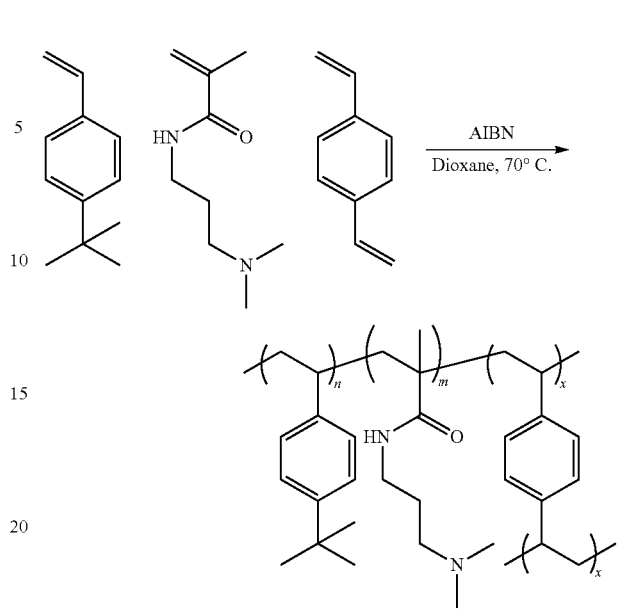

SCHEME 1.1: Copolymerization of tBSt, DMAPMAm and DVB in 1,4-Dioxane Initiated with AIBN at 70° C.

Polymerization Conditions and Data:

TABLE 1.1

Conditions and Results for the copolymerization of tBSt, DMAPMAm and DVB

| Polymer Code | Monomer feed ratio [tBSt]:[DMAPMAm]:[DVB]:[AIBN] | Copolymer ratio after ppt. [tBSt]:[DMAPMAm]$^\alpha$ | Yield (%) |
|---|---|---|---|
| P1.1  | 125.9:74.1:0.25:1  | 1:0.25 | 72.5 |
| P1.2  | 123.1:76.9:0.25:1  | 1:0.19 | 70.1 |
| P1.3  | 120:80:0.25:1      | 1:0.23 | 71.1 |
| P1.4  | 116.7:83.3:0.25:1  | 1:0.25 | 74.6 |
| P1.5  | 113:87:0.25:1      | 1:0.25 | 75.1 |
| P1.6  | 107:93:0:1         | 1:0.27 | 74.7 |
| P1.7  | 107:93:0.25:1      | 1:0.26 | 72.9 |
| P1.8  | 107:93:0.5:1       | 1:0.36 | 72.5 |
| P1.9  | 107:93:0.75:1      | N/A$^\beta$ | N/A$^\beta$ |
| P1.10 | 100:100:0.25:1     | 1:0.35 | 74.5 |
| P1.11 | 94.7:105.3:0.25:1  | 1:0.42 | 72.3 |

$^\beta$Too viscous to purify.

The copolymer ratio after precipitation was estimated from $^1$H-NMR spectroscopy. As shown, the presence of different quantities of the monomer pairs and cross-linker influences the ratio of repeat units in the polymer but the ratios are not the same. In the case of P1.9, without wishing to be bound by any theory, it appears that a combination of a relatively low ratio of hydrophobic to acrylamide monomer and high degree of cross-linker provides a polymer which was too viscous to purify. All other polymers could be successfully formed into a membrane.

Example 2: Modification of P(tBSt-co-DMAPMAm-co-DVB) with BrBu

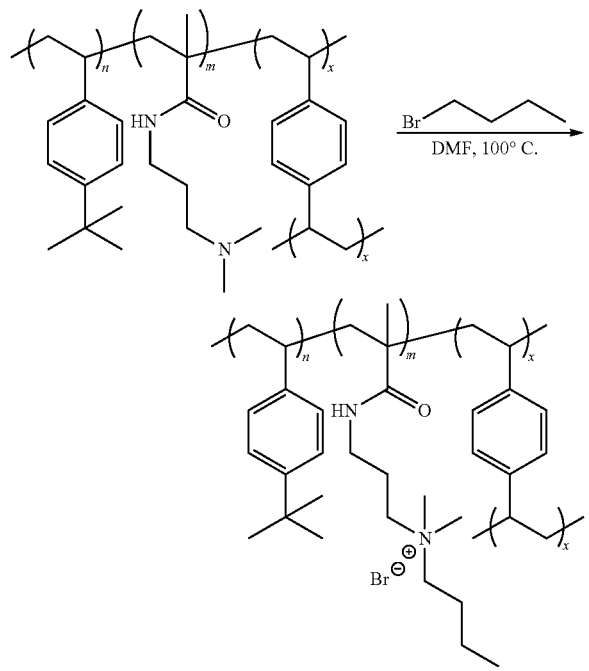

Scheme 1.2: Modification of P(tBSt-co-DMAPMAm-co-DVB) with BrBu in DMF at 100° C.

TABLE 1.2

Synthesis of P(tBSt-co- MAPDMBAB-co-DVB) reaction conditions and results.

| Polymer Code | Polymer Modified | Polymer (g) | DMF (g) | BrBu (mL) | Yield (%) | Mass removed before casting (wt %) |
|---|---|---|---|---|---|---|
| P1.12 | P1.1 | 3 | 7 | 3.6 | 81.7 | 24.1 |
| P1.13 | P1.2 | 3 | 7 | 3.8 | 86.5 | 21.9 |
| P1.14 | P1.3 | 3 | 7 | 3.9 | 87.4 | 24.3 |
| P1.15 | P1.4 | 3 | 7 | 4.1 | 92.4 | 28.9 |
| P1.16 | P1.5 | 3 | 7 | 4.2 | 93.1 | 25.4 |
| P1.17 | P1.6 | 3 | 7 | 4.5 | 89.7 | 27.2 |
| P1.18 | P1.7 | 3 | 7 | 4.5 | 91.6 | 25.8 |
| P1.19 | P1.8 | 3 | 7 | 4.5 | 91.4 | 24.9 |
| P1.20 | P1.10 | 3 | 7 | 4.9 | 91.4 | 24.9 |
| P1.21 | P1.11 | 3 | 7 | 5.1 | 90.0 | 28.8 |

TABLE 1.3

Casting conditions and water uptake of P(tBSt-co-MAPDMBAB-co-DVB) membranes.

| Membrane Code | Polymer Utilised | Casting Thickness (μm) | Water Uptake (%) |
|---|---|---|---|
| M1.1 [α] | P1.12 | 150 | 56.0 |
| M1.2 | P1.13 | 75 | 76.7 |
| M1.3 | P1.13 | 150 | 43.3 |
| M1.4 | P1.14 | 150 | 54.8 |
| M1.5 | P1.15 | 150 | 59.3 |
| M1.6 | P1.16 | 150 | 81.7 |
| M1.7 | P1.17 | 150 | 80.9 |
| M1.8 | P1.18 | 150 | 88.0 |
| M1.9 | P1.19 | 150 | 77.1 |
| M1.10 | P1.20 | 150 | 132.4 |
| M1.11 [α] | P1.21 | 150 | 241.6 |

[α] Could form a free-standing membrane but was unsuitable for $CO_2$ electrolysis

Example 3: $CO_2$ Electrolysis Using P(tBSt-co-MAPDMBAB-co-DVB) Membranes $CO_2$ electrolysis was carried out using the membranes M1.2 to M1.10 as described in table 1.3 and Example 8 below. This data is shown in FIGS. 1 to 9. As can be seen, a stable potential was provided across the membrane in all cases with surprisingly high production of CO, consistently above 90% selectivity, also being provided.

Example 4: CO Electrolysis Using P(tBSt-co-MAPDMBAB-co-DVB) Membranes

Figure 10:
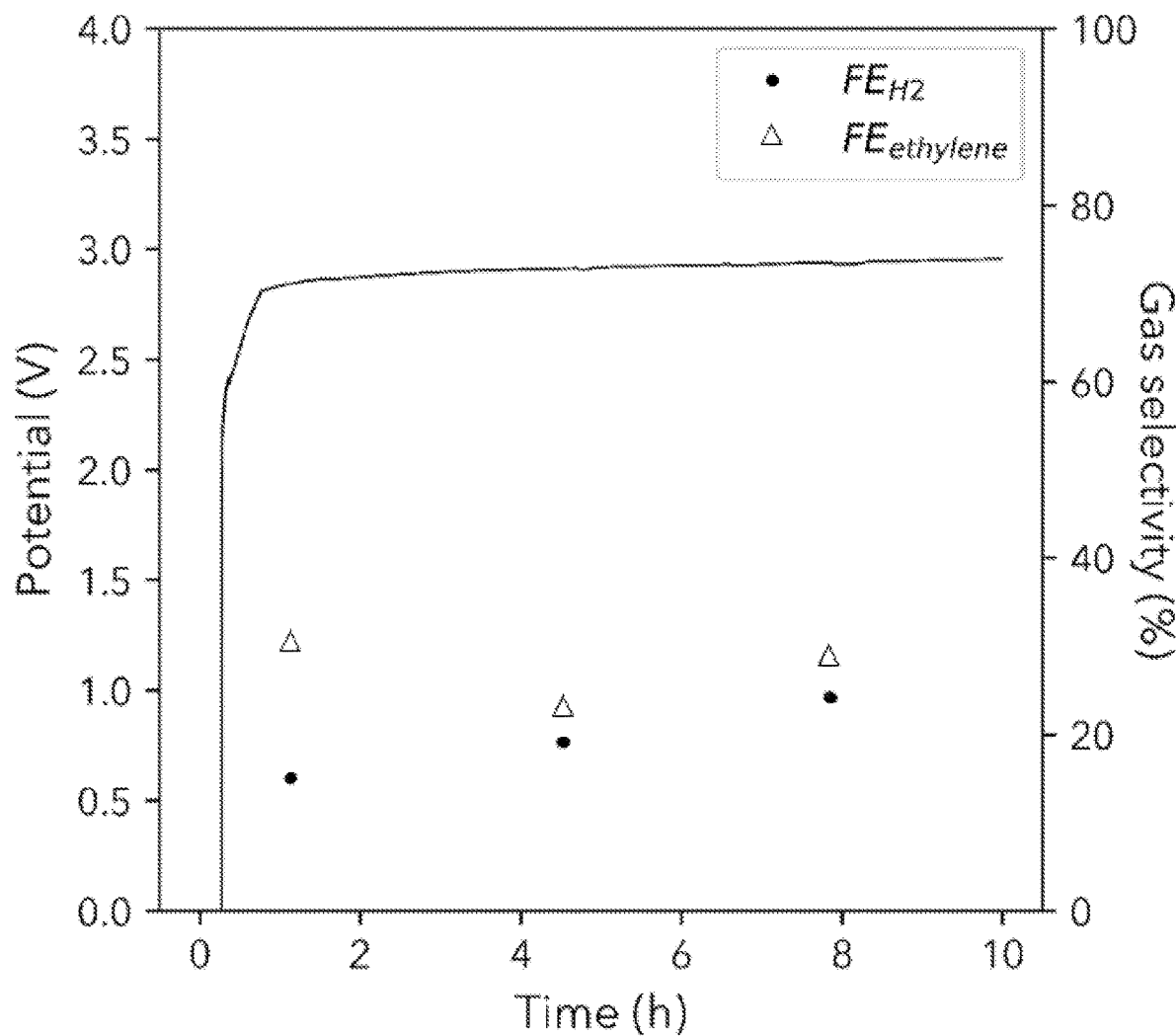
FIG. 10 is a graph showing voltage and FE for gas products against time for the conversion of CO to $C_2H_4$ using the membrane M1.6, electrolysis performed at 5 $cm^2$ cell scale operating at 400 $mA/cm^2$.

CO electrolysis was carried out using the membrane 1.6 described in table 1.3 and according to Example 9 below. This data is shown in FIG. 10. A consistent potential is shown, alongside good production of both ethylene and $H_2$.

Example 5: Example Copolymerization of tBSt, DMAPMAm and DVB tBSt is passed through a column of neutral aluminum oxide prior to use to remove the inhibitor. tBSt (5 mL, 27.3 mmol), DMAPMAm (4.64 g, 27.3 mmol), DVB (10 μL, 0.07 mmol) AIBN (0.0448 g, 0.27 mmol) and 1,4-dioxane (10.0 mL) were charged into a flask before sparging with Argon gas. Subsequently, the mixture was heated at 70° C. for 20 hours. P(tBSt-co-DMAPMAm-co-DVB) was precipitated into distilled water (200 mL), supernatant was decanted, and the P(tBSt-co-DMAPMAm-co-DVB) was dried under vacuum. P(tBSt-co-DMAPMAm-co-DVB) was suspended in distilled water (200 mL), stirred overnight, filtered, and finally dried under vacuum.

Example 6: Example Modification of P(tBSt-co-DMAPMAm-co-DVB) with BrBu

P(tBSt-co-DMAPMAm-co-DVB) (3 g) was mixed with DMF (7 g) and sparged with Argon gas for 20 mins. BrBu (4.9 mL, 45.4 mmol) was injected into the mixture and sparging was continued for a further 10 mins. Mixture was heated at 100° C. for 24 hours.

Example 7: Example Casting of a P(tBSt-co-MAPDMAB-co-DVB) Membrane

Solution containing (tBSt-co-MAPDMAB-co-DVB), BrBu and DMF was first concentrated before decanting the solution directly onto a glass slide and cast into a membrane using a membrane applicator. Membrane thickness was controlled using an adjustable doctor blade. Membranes were dried by heating at 50° C. for 1 hour. Membranes were removed from the glass slide by submerging in 1M KOH solution, membranes were stored in 1M KOH solution.

Example 8: Example Electrolysis of $CO_2$ to CO

Electrolysis MEA was prepared using an iridium based anode, silver based cathode and one of the P(tBSt-co-DMBuAPMAmBr-co-DVB) membranes described above, electrodes were 5 cm². The outer system consisted of an electrolyte flow loop and a $CO_2$ inlet attached to a cylinder of compressed $CO_2$. The fluid inputs were controlled using an array of custom-built electrolyzer control boards and an accompanying graphical user interface. Voltage was applied to the electrolyzer cell through 2 cables connected to an external power supply. The voltage applied was sufficient to pass between 1 A (200 mA/cm²) of current through the MEA, which was to determine the rate of electrocatalytic transformation.

An outlet in line with the $CO_2$ input was used to continuously analyze the products of electrolysis from the cell. During electrolysis, a gas chromatograph was used to analyze the composition of this outlet to determine the selectivity of the MEA. The quantity of $CO_2$ transformed was calculated based on the assumption that all current went towards either $H_2O$ or $CO_2$ electrolysis and that the only product of $CO_2$ electrolysis was carbon monoxide. The cumulated quantity of $CO_2$ transformed was then calculated based on equation (1):

$$CO_2 \text{ converted (kg)} = \frac{m_{CO_2}}{2F} \int_0^{21} i(t) FE_{CO}(t) dt \qquad (1)$$

Where i(t) is the current (A) at time t, $FE_{CO}(t)$ is the value of the Faradaic Efficiency (%) towards CO production at time t, $m_{co_2}$ is the molecular weight of carbon dioxide (0.044 kg mol⁻¹) and F is the Faraday constant (C mol⁻¹).

Example 9: Example Electrolysis of CO to $C_{2+}$

Electrolysis MEA was prepared using a nickel-based anode, copper-based cathode and one of the P(tBSt-co-DMBuAPMAmBr-co-DVB) membranes described above, electrodes were 5 cm². The outer system consisted of an electrolyte flow loop and a CO inlet attached to a cylinder of compressed CO. The fluid inputs were controlled using an array of custom-built electrolyzer control boards and an accompanying graphical user interface. Voltage was applied to the electrolyzer cell through 2 cables connected to an external power supply. The voltage applied was sufficient to pass 2 A (400 mA/cm²) of current through the MEA, which was to determine the rate of electrocatalytic transformation. During electrolysis, both a gas chromatograph analysis and the was used to quantify the output of the cell.

To determine the selectivity of the MEA, the gas outlet was sampled and analyzed using an inline gas chromatograph. Liquid products Faradaic efficiencies were computed using a water suppression quantitative NMR spectroscopy analysis. Both the cathode trap and the anolyte were analyzed and DMSO was used as the internal standard for quantification. For each product (gas or liquid), the Faradaic efficiency was calculated ($FE_x$) based on the equation (2):

$$FE_x(\%) = \frac{n_x \times n_{e-x} \times F}{Q} \times 100 \qquad (2)$$

where $n_x$ is the amount of product (mol) either calculated from the gas chromatograph for gas product or by NMR spectroscopy for liquid product, $n_{e-GP}$ is the number of electrons involved in the $CO/H_2O$ reduction to make GP, F is the Faraday constant (96485 C/mol) and Q is the total charge passed.

Example 10: Water Uptake (WU) Measurement

Where a water uptake measurement is shown above, it was measured according to this method. A 4 cm×4 cm square of membrane was submerged in 1M KOH for >24 hours. 1M KOH was refreshed before removing the membrane from the 1M KOH, removing excess solution and weighing the membrane in a hydrated state ($W_{wet}$). Membrane was placed in a vacuum oven at 70° C. to evaporate the water before weighing the membrane in a dehydrated state ($W_{dry}$). Water uptake was calculated using the following equation (3). Measurement was performed twice and the average result was taken.

$$WU = \frac{W_{wet} - W_{dry}}{W_{dry}} \times 100\% \qquad (3)$$

Example 11: Copolymerization of St, DMAPMAm and DVB

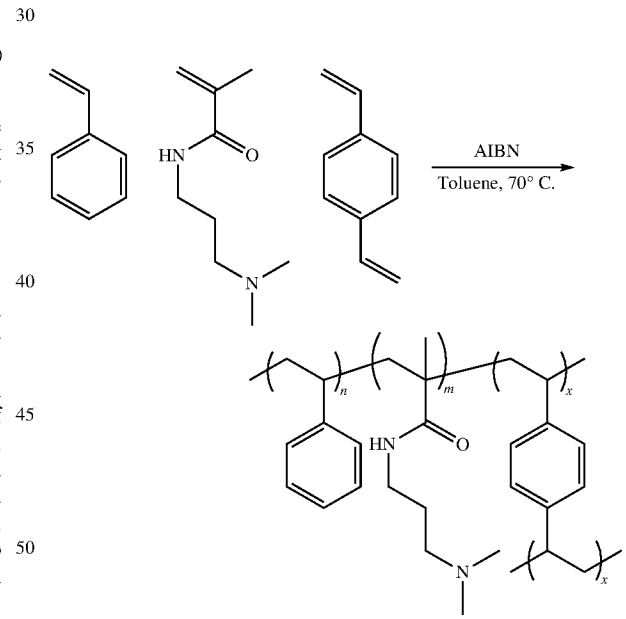

Scheme 2.1: Copolymerization of St, DMAPMAm and DVB in Toluene Initiated with AIBN at 70° C.

TABLE 2.1

Conditions and Results for the copolymerization of St, DMAPMAm and DVB.

| Polymer Code | Monomer feed ratio [St]:[DMAPMAm]:[DVB]:[AIBN] |
|---|---|
| P2.1 | 133.3:66.7:1.5:1 |

Example 12: Modification of P(St-co-DMAPMAm-co-DVB) with BzCl

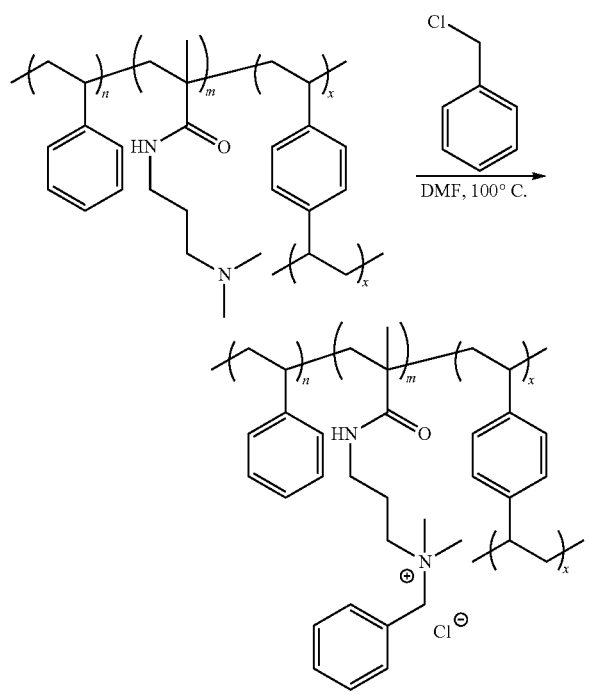

Scheme 2.2: Modification of P(St-co-DMAPMAm-co-DVB) with BzCl in DMF at 100° C.

TABLE 2.2

Synthesis of P(St-co-MAPDMBAC-co-DVB) reaction conditions and results.

| Polymer Code | Polymer Modified | Polymer (g) | DMF (g) | BzCL (mL) |
|---|---|---|---|---|
| P2.2 | P2.1 | 0.8 | 3 | 1.21 |

TABLE 2.3

Casting conditions of P(St-co-MAPDMBAC-co-DVB) membrane.

| Membrane Code | Polymer Utilised | Solvent | Polymer concentration (wt %) | Casting Thickness (μm) |
|---|---|---|---|---|
| M2.1 | P1.12 | DMF | 40 | 150 |

Example 13: Example Copolymerization of St, DMAPMAm and DVB

St is passed through a column of neutral aluminum oxide prior to use to remove the inhibitor. St (3 mL, 26.1 mmol), DMAPMAm (2.2215 g, 13.0 mmol), DVB (42 μL, 0.29 mmol) AIBN (0.0321 g, 0.20 mmol) and toluene (5.4 mL) were charged into a flask before sparging with Argon gas for 30 mins. Subsequently, the mixture was heated at 70° C. for 20 hours. P(St-co-DMAPMAm-co-DVB) was precipitated into n-heptane (150 mL), supernatant was decanted, and the P(St-co-DMAPMAm-co-DVB) was dried under vacuum. P(St-co-DMAPMAm-co-DVB) was suspended in distilled water (150 mL), stirred for 1 hour, filtered and finally dried under vacuum.

Example 14: Example Modification of P(St-co-DMAPMAm-co-DVB) with BzCl

P(St-co-DMAPMAm-co-DVB) (0.8 g) was mixed with DMF (3 g) and sparged with Argon gas for 20 mins. BzCl (1.21 mL, 10.5 mmol) was injected into the mixture and sparging was continued for a further 10 mins. Mixture was heated at 100° C. for 24 hours. P(St-co-MAPDMBAC-co-DVB) was precipitated into ethyl acetate (100 mL), supernatant was decanted and the P(St-co-MAPDMBAC-co-DVB) was dried under vacuum. P(St-co-MAPDMBAC-co-DVB) was redissolved in ethanol (10 mL), precipitated into n-heptane (100 mL), filtered and finally dried under vacuum.

Example 15: Example Casting of a P(St-co-MAPDMBAC-co-DVB) Membrane

P(St-co-MAPDMBAC-co-DVB) (0.5 g) was dissolved in DMF (0.75 g). P(St-co-MAPDMBAC-co-DVB) solution was decanted directly onto a glass slide and cast into a membrane using a membrane applicator. Membrane thickness was controlled using an adjustable doctor blade. Membranes were dried by heating at 50° C. for 1 hour. Membranes were removed from the glass slide by submerging in 1M KOH solution, membranes were stored in 1M KOH solution.

Figure 11:
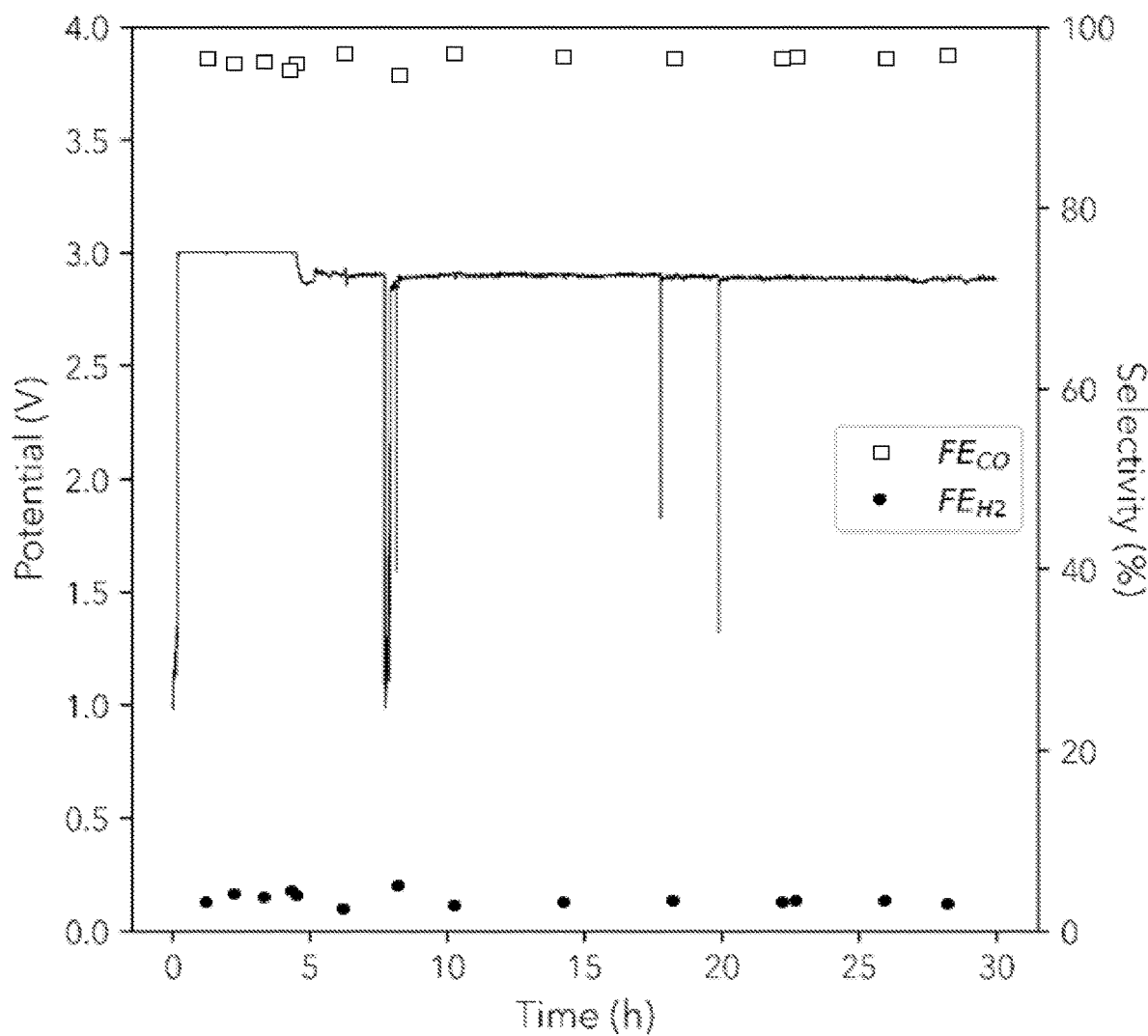
FIG. 11 is a graph showing voltage and FE against time for the conversion of $CO_2$ to CO using the membrane M2.1, electrolysis performed at 5 $cm^2$ cell scale operating at 200 $mA/cm^2$.

Example 16: $CO_2$ Electrolysis Usinq P(St-co-MAPDMAC-co-DVB) Membranes $CO_2$ electrolysis was carried out using the membrane M2.1 as described in table 2.3 and the method described in Example 8. This data is shown in FIG. 11. While some potential drops are observed, stability of potential develops over time. Surprisingly high production of CO (over 90 mol % selectivity) is observed.

Example 17: Example Electrolysis of $CO_2$ to CO

Same method as described in Example 8.

Example 18: Synthesis of Non-Ionic Base Polymer P (St-co-DMAPMAm)

St is passed through a column of neutral aluminum oxide prior to use to remove the inhibitor. St (3 mL, 26.1 mmol), DMAPMAm (1.9747 g, 11.6 mmol), AIBN (0.0309 g, 0.19 mmol) and toluene (5.1 mL) were charged into a flask before sparging with Argon gas. Subsequently, the mixture was heated at 70° C. for 20 hours. P(St-co-DMAPMAm) was precipitated into n-hexane (150 mL), supernatant was decanted and the P(St-co-DMAPMAm) was dried under vacuum. P(St-co-DMAPMAm) was suspended in distilled water (150 mL), stirred for 1 hour, filtered and finally dried under vacuum.

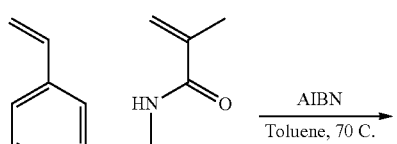

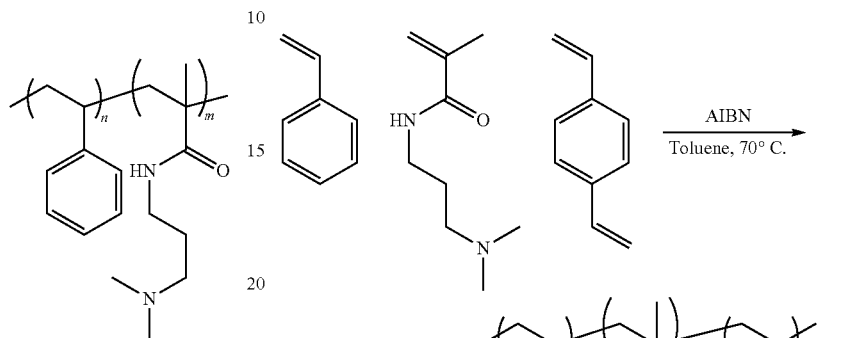

Scheme 3.1: Copolymerization of St and DMAPMAm in Toluene Initiated with AIBN at 70° C.

Example 19: Synthesis of Cationic Polymer P (St-co-MPDMBAC)

P(St-co-DMAPMAm) (0.8 g) was dissolved in DMF (3 mL) and sparged with Argon gas for 15 mins. BzCl (1.14 mL, 9.9 mmol) was injected into the P(St-co-DMAPMAm) solution and the mixture was sparged for a further 15 mins. Mixture was heated at 100° C. for 24 hours. P(St-co-MPDMBAC) was precipitated into ethyl acetate (75 mL), supernatant was decanted and the P(St-co-MPDMBAC) was dried under vacuum. P(St-co-MPDMBAC) redissolved in ethanol (5 mL), precipitated into n-hexane (75 mL), filtered and finally dried under vacuum.

Example 20: Preparation of AEM with P (St-co-MPDMBAC)

P(St-co-MPDMBAC) (0.5 g) was dissolved in DMF (0.5 g). P(St-co-MPDMBAC) solution was decanted directly onto a glass slide and cast into a membrane using a membrane applicator. Membrane thickness was controlled using an adjustable doctor blade. Membranes were dried by heating at 50° C. for 1 hour. Membrane was removed from the glass slide by submerging in 1M KOH solution, membranes were stored in 1M KOH solution.

Figure 12:
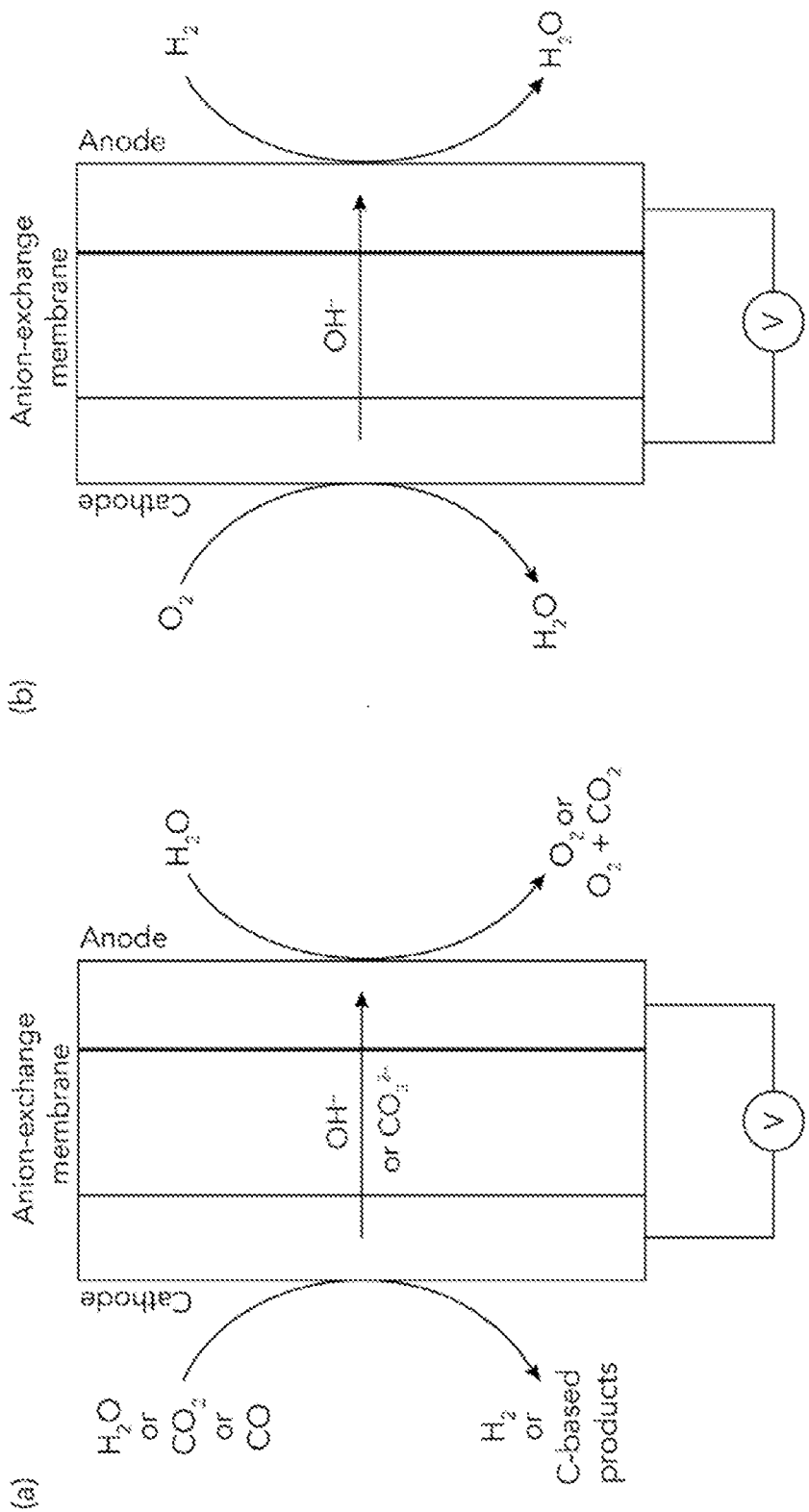
FIG. 12 is a diagram showing an anion-exchange membrane operated as an electrolyzer of water and/or $CO_2$ and/or CO (a) or as a fuel cell (b). In each case, the polymeric membrane mediates the crossing of anions from cathode to anode to facilitate the conversion reactions occurring at the electrode.

The resulting membrane is then subsequently assembled in a membrane electrode assembly by combination with anodic and cathodic catalysts and porous transport layers. The resulting MEA may then be operated as an electrolyzer of water and/or $CO_2$ and/or CO (see FIG. 12 (a)), or as a fuel cell (see FIG. 12 (b)). In this case the polymeric membrane mediates the crossing of anions from cathode to anode to facilitate the conversion reactions occurring at the electrode.

Example 21: Synthesis of Non-Ionic Base Polymer P (St-co-DMAPMAm-co-DVB)

St is passed through a column of neutral aluminum oxide prior to use to remove the inhibitor. St (3 mL, 26.1 mmol), DMAPMAm (2.2215 g, 11.6 mmol), DVB (13 μm, 0.09 mmol), AIBN (0.0321 g, 0.20 mmol) and toluene (5.4 mL) were charged into a flask before sparging with Argon gas. Subsequently, the mixture was heated at 70° C. for 20 hours. P(St-co-DMAPMAm-co-DVB) was precipitated into n-hexane (150 mL), supernatant was decanted and the P(St-co-DMAPMAm-co-DVB) was dried under vacuum.

P(St-co-DMAPMAm-co-DVB) was suspended in distilled water (150 mL), stirred for 1 hour, filtered and finally dried under vacuum.

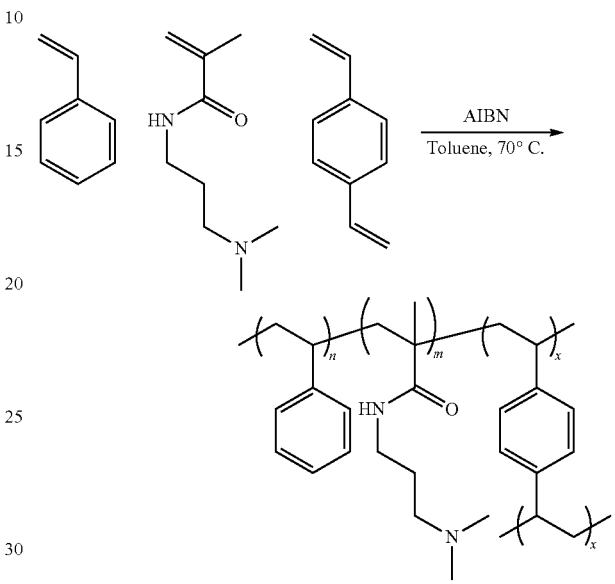

Scheme 4.1: Copolymerization of St, DMAPMAm and DVB in Toluene Initiated with AIBN at 70° C.

Example 22: Synthesis of Cationic Polymer P(St-co-MPDMBAC-co-DVB)

Synthesis of cationic polymer P(St-co-MPDMBAC-co-DVB). P(St-co-DMAPMAm-co-DVB) (0.8 g) was dissolved in DMF (3 mL) and sparged with Argon gas for 15 mins. BzCl (1.21 mL, 10.5 mmol) was injected into the P(St-co-DMAPMAm-co-DVB) solution and the mixture was sparged for a further 15 mins. Mixture was heated at 100° C. for 24 hours. P(St-co-MPDMBAC-co-DVB) was precipitated into ethyl acetate (75 mL), supernatant was decanted and the P(St-co-MPDMBAC-co-DVB) was dried under vacuum. P(St-co-MPDMBAC-co-DVB) redissolved in ethanol (5 mL), precipitated into n-hexane (75 mL), filtered and finally dried under vacuum. P(St-co-MPDMBAC-co-DVB) was prepared into an AEM using the same procedure as described in Example 20.

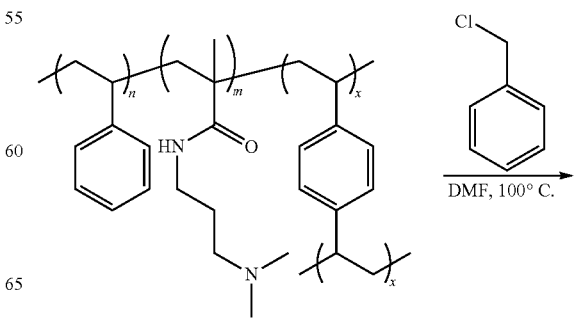

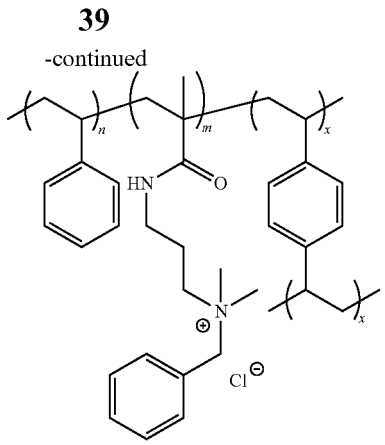

Scheme 4.2: Modification of
P(St-co-DMAPMAm-co-DVB) with BzCl in DMF
at 100° C.

The resulting membrane is then subsequently assembled in a membrane electrode assembly by combination with anodic and cathodic catalysts and porous transport layers. The resulting MEA may then be operated as an electrolyzer of water and/or $CO_2$ and/or CO (see FIG. 12 (a)), or as a fuel cell (see FIG. 12 (b)). In this case the polymeric membrane mediates the crossing of anions from cathode to anode to facilitate the conversion reactions occurring at the electrode.

Example 23: Synthesis of Cationic Polymer P
(St-co-MPDMBAC) Crosslinked with BCMBP P(St-co-DMAPMAm) (0.8 g) from Example 1 was dissolved in DMF (3 mL) and sparged with Argon gas for 15 mins. BCMBP dissolved in DMF (1 wt %, 0.789 mL, 0.030 mmol) was injected into the P(St-co-DMAPMAm) solution and the mixture was sparged for a further 15 mins. Mixture was heated at 100° C. for 18 hours. BzCl (1.14 mL, 9.91 mmol) was injected into the P(St-co-DMAPMAm) solution and the mixture was heated at 100° C. for a further 24 hours. P(St-co-MPDMBAC) crosslinked with BCMBP was precipitated into ethyl acetate (75 mL), supernatant was decanted and the P(St-co-MPDMBAC) was dried under vacuum. P(St-co-MPDMBAC) redissolved in ethanol (5 mL), precipitated into n-hexane (75 mL), filtered and finally dried under vacuum. P(St-co-MPDMBAC) crosslinked with BCMBP was prepared into an AEM using the same procedure as described in Example 20.

The resulting membrane is then subsequently assembled in a membrane electrode assembly by combination with anodic and cathodic catalysts and porous transport layers. The resulting MEA may then be operated as an electrolyzer of water and/or $CO_2$ and/or CO (see FIG. 12 (a)), or as a fuel cell (see FIG. 12 (b)). In this case the polymeric membrane mediates the crossing of anions from cathode to anode to facilitate the conversion reactions occurring at the electrode.

Example 24: Preparation of AEM with P
(St-co-MPDMBAC) Reinforced with Nafion D521

P(St-co-MPDMBAC) (0.5 g) from example B was dissolved in DMF (0.5 g) Nafion D521 (0.3 g) was added to the P(St-co-MPDMBAC) solution and stirred slowly until homogeneous. P(St-co-MPDMBAC) reinforced with Nafion D was prepared into an AEM using the same procedure as described in Example 20.

The resulting membrane is then subsequently assembled in a membrane electrode assembly by combination with anodic and cathodic catalysts and porous transport layers. The resulting MEA may then be operated as an electrolyzer of water and/or $CO_2$ and/or CO (see FIG. 12 (a)), or as a fuel cell (see FIG. 12 (b)). In this case the polymeric membrane mediates the crossing of anions from cathode to anode to facilitate the conversion reactions occurring at the electrode.

Example 25: Synthesis of Non-Ionic Base Polymer
P (4tBSt-coDMAPMAm)

4tBSt is passed through a column of neutral aluminium oxide prior to use to remove the inhibitor. 4tBSt (4 mL, 21.8 mmol), DMAPMAm (3.2332 g, 19.0 mmol), AIBN (0.0335 g, 0.204 mmol) and toluene (0 mL, 0.0 mmol) were charged into a flask before sparging with Argon gas. Subsequently, the mixture was heated at 70° C. for 20 hours. P(4tBSt-co-DMAPMAm) was precipitated into acetonitrile (150 mL), supernatant was decanted and the P(4tBSt-co-DMAPMAm) was dried under vacuum. P(4tBSt-co-DMAPMAm) was suspended in distilled water (150 mL), stirred for 1 hour, filtered and finally dried under vacuum.

Example 26: Synthesis of Cationic Polymer P
(4tBSt-co-DMAPMAm)

P(4tBSt-co-DMAPMAm) (0.75 g) was dissolved in DMF (2 mL) and THF (2 mL) and sparged with Argon gas for 15 mins. BrBu (0.68 mL, 6.33 mmol) was injected into the P(4tBSt-co-DMAPMAm) solution and the mixture was sparged for a further 15 mins. Mixture was heated at 100° C. for 24 hours. P(4tBSt-co-MPDMBAB) was precipitated into ethyl acetate (75 mL), supernatant was decanted and the P(4tBSt-co-MPDMBAB) was dried under vacuum. P(4tBSt-co-MPDMBAB) redissolved in ethanol (5 mL), precipitated into n-hexane (75 mL), filtered and finally dried under vacuum. P(4tBSt-co-MPDMBAB) was prepared into an AEM using the same procedure as described in Example 20.

The resulting membrane is then subsequently assembled in a membrane electrode assembly by combination with anodic and cathodic catalysts and porous transport layers. The resulting MEA may then be operated as an electrolyzer of water and/or $CO_2$ and/or CO (see FIG. 12 (a)), or as a fuel cell (see FIG. 12 (b)). In this case the polymeric membrane mediates the crossing of anions from cathode to anode to facilitate the conversion reactions occurring at the electrode.

What is claimed is:

1. A membrane formed by a copolymer comprising: first repeat units of an acrylamide moiety and second repeat units of a hydrophobic moiety, wherein the molar ratio of second repeat units:first repeat units is between 0.8:1 to 2.5:1 based on a molar ratio of the respective monomers in a production feed; and wherein the membrane has a water uptake of between 30% and 200%.

2. The membrane according to claim 1, the copolymer further comprising a crosslinker wherein the amount of cross-linker in a corresponding monomer feed is 0 to 1 mol %, based on the total monomer in the production feed.

3. The copolymer according to claim 2 wherein the cross-linker comprises at least two halide atoms.

4. The membrane according to claim 2, wherein the cross-linker is divinylbenzene.

5. The membrane according to claim 1, wherein the acrylamide moiety comprises an ionic substituent.

6. The membrane according to claim 1, wherein the first repeat units are of formula (I), wherein formula (I) is defined as:

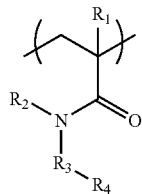

(I)

wherein:

$R_1$ is selected from the group consisting of: hydrogen; $C_{1-20}$ alkyl, optionally substituted; heterocyclyl, optionally substituted; aryl, optionally substituted; heteroaryl, optionally substituted; and cyano;

$R_2$ is selected from the group consisting of: hydrogen; $C_{1-20}$ alkyl, optionally substituted; heterocyclyl, optionally substituted; aryl, optionally substituted; a heteroaryl, optionally substituted; and cyano;

$R_3$ is a $C_{1-20}$ alkylene, optionally substituted; and $R_4$ is a quaternary ammonium.

7. The membrane according to claim 6, wherein the quaternary ammonium salt is represented by formula (Ia):

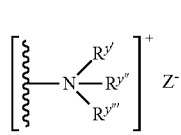

(Ia)

wherein R', R" and R'" are independently selected from the group consisting of: hydrogen; $C_{1-20}$ alkyl, optionally substituted; heterocyclyl, optionally substituted; aryl, optionally substituted; alkyl-aryl, optionally substituted; heteroaryl, optionally substituted; and cyano;

wherein $Z^-$ is a counter ion.

8. The membrane according to claim 6, wherein the first repeat unit is selected from:

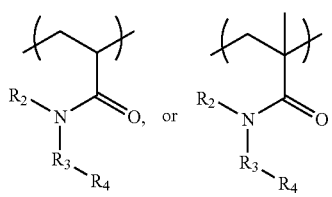

wherein:

$R_2$ is selected from the group consisting of hydrogen and $C_{1-4}$ alkyl;

$R_3$ is $C_{1-4}$ alkylene; and $R_4$ is a quaternary ammonium salt.

9. The copolymer according to claim 1, wherein the first repeat units are of formula (II), wherein formula (II) is defined as:

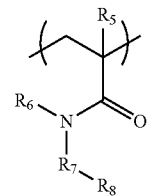

(II)

wherein:

$R_5$ is selected from the group consisting of: $C_{1-20}$ alkyl, optionally substituted; heterocyclyl, optionally substituted; aryl, optionally substituted; alkyl-aryl, optionally substituted; heteroaryl, optionally substituted; and cyano;

$R_6$ is selected from the group consisting of: $C_{1-20}$ alkyl, optionally substituted; heterocyclyl, optionally substituted; aryl, optionally substituted; alkyl-aryl, optionally substituted; heteroaryl, optionally substituted; and cyano; and $R_7$ is selected from the group consisting of hydrogen and a $C_{1-20}$ alkylene, optionally substituted;

wherein: when R7 is hydrogen, R8 is not present; and when R7 is not hydrogen, $R_8$ is selected from the group consisting of: —N(Ra')Ra"; —C(O)N(Rb') Rb"; —P(Rc')Rc"; and —S(Rd');

wherein: Ra', Ra", Rb', Rb", Rc', Rc" and Rd' are independently selected from the group consisting of: hydrogen; halo; $C_{1-20}$ alkyl, optionally substituted; heterocyclyl, optionally substituted; aryl, optionally substituted; alkyl-aryl, optionally substituted; and heteroaryl, optionally substituted; and, alternatively, Ra' and Ra"; or Rb' and Rb"; or Rc' and Rc"; are linked together to form, together with the hetero atom to which they are attached, a 4- to 7-membered ring, which ring optionally contains one further heteroatom and which ring optionally is substituted by one or more groups selected from halo and =O.

10. The copolymer according to claim 9, wherein $R_8$ is —N(Ra')Ra", and wherein Ra' and Ra" are independently selected from the group consisting of: hydrogen; $C_{1-10}$ alkyl, optionally substituted; and $C_{1-6}$ alkyl-aryl, optionally substituted.

11. The membrane according to claim 9, wherein $R_1$ and $R_5$ are independently selected from the group consisting of hydrogen and $C_{1-10}$ alkyl, optionally substituted.

12. The membrane according to claim 9, wherein $R_2$ and $R_6$ are independently selected from the group consisting of hydrogen and $C_{1-10}$ alkyl, optionally substituted.

13. The membrane according to claim 9, wherein $R_3$ and $R_7$ are $C_{1-10}$ alkylene, optionally substituted.

14. The copolymer according to claim 9, wherein the first repeat unit is selected from:

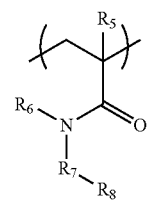

(II)

wherein:

$R_5$ is selected from the group consisting of hydrogen and methyl;

$R_6$ is hydrogen;

$R_7$ is $C_{1-3}$ alkylene; and $R_8$ is —N(Ra')Ra", wherein Ra' and Ra" are independently selected from the group consisting of hydrogen, $C_{1-4}$ alkyl, and $C_{1-3}$ alkyl-aryl.

15. The membrane according to claim 1, wherein the second repeat units comprise an optionally substituted $C_{4-20}$ group pendent from a polymer back-bone.

16. The membrane according to claim 15, wherein the second repeat units are substituted with aromatic groups.

17. The membrane according to claim 1, wherein the second repeat units are of the formula (III), wherein formula (III) is defined as:

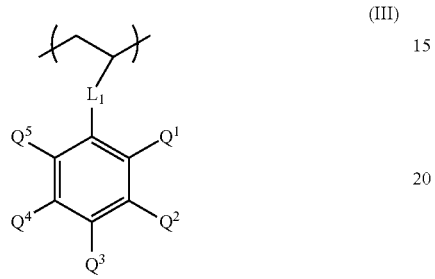

(III)

wherein: $Q^1$, $Q^2$, $Q^3$, $Q^4$ and $Q^5$ are independently selected from the group consisting of: hydrogen; F; methyl; ethyl; n-propyl; i-propyl; —CF$_3$; n-butyl; and t-butyl; and $L_1$ is optional $C_{1-6}$ alkylene, optionally substituted.

18. The membrane according to claim 1, wherein the second repeat unit is an optionally substituted styrene repeat unit.

19. The membrane according to claim 1, wherein the membrane has a single layer casting thickness of between 10 to 1000 μm.

20. An electrolytic cell comprising an anode, a cathode and a membrane positioned therebetween, wherein the membrane comprises a polymer comprising first repeat units of an acrylamide moiety and second repeat units of a hydrophobic moiety, wherein the molar ratio of second repeat units:first repeat units is between 1:1 to 2:1 based on a molar ratio of the respective monomers in a production feed; and wherein the membrane has a water uptake of between 30% and 200%.

21. A method of forming a membrane formed by a polymer, the method comprising forming a first polymer by:
    mixing a first monomer comprising an acrylamide moiety, a hydrophopic second monomer and an optional cross-linker; wherein the molar ratio of the second monomer: first monomer is between 0.8:1 to 2.5:1 and the amount of cross-linker is from 0 to 1 mol %, based on a total amount of monomer present; and initiating a polymerisation;
    wherein the membrane has a water uptake of between 30% and 200%.

22. The method according to claim 21, wherein the first monomer comprises the formula:

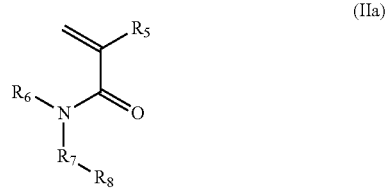

(IIa)

wherein: $R_5$ is selected from the group consisting of: hydrogen; $C_{1-20}$ alkyl, optionally substituted; heterocyclyl, optionally substituted; aryl, optionally substituted; heteroaryl, optionally substituted; and cyano;

$R_6$ is selected from the group consisting of: hydrogen; $C_{1-20}$ alkyl, optionally substituted; heterocyclyl, optionally substituted; aryl, optionally substituted; a heteroaryl, optionally substituted; and cyano; and $R_7$ is selected from the group consisting of hydrogen and $C_{1-20}$ alkylene, optionally substituted;

wherein: when R7 is hydrogen, R8 is not present; and when R7 is not hydrogen, $R_8$ is selected from the group consisting of: —N(Ra')Ra"; —C(O)N(Rb')Rb"; —P(Rc')Rc"; and —S(Rd');

wherein: Ra', Ra", Rb', Rb", Rc', Rc" and Rd' are independently selected from the group consisting of: hydrogen; halo; $C_{1-20}$ alkyl, optionally substituted; heterocyclyl, optionally substituted; aryl, optionally substituted; alkyl-aryl, optionally substituted; and heteroaryl, optionally substituted; and, alternatively, Ra' and Ra"; or Rb' and Rb"; or Rc' and Rc"; are linked together to form, together with the hetero atom to which they are attached, a 4- to 7-membered ring, which ring optionally contains one further heteroatom and which ring optionally is substituted by one or more groups selected from halo and =O.

23. The method according to claim 22 further comprising reacting the first polymer with a molecule of the formula $X^L$-$R_9$, wherein: $X^L$ is a leaving group; and $R_9$ is selected from the group consisting of: $C_{1-20}$ alkyl, optionally substituted; heterocyclyl, optionally substituted; aryl, optionally substituted; alkyl-aryl, optionally substituted; and heteroaryl, optionally substituted.

24. The method according to claim 23, wherein $X^L$ is selected from the group consisting of: chloride; bromide; and iodide.

25. The method according to claim 23, wherein $R_9$ is selected from the group consisting of $C_{1-10}$ alkyl, optionally substituted and 6-membered $C_{1-6}$ alkyl-aryl, optionally substituted.

26. The method according to claim 21, wherein the hydrophobic monomer comprises a structure:

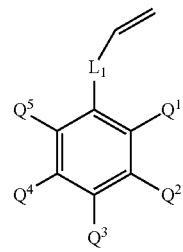

wherein, $Q^1$, $Q^2$, $Q^3$, $Q^4$ and $Q^5$ are independently selected from the group consisting of: hydrogen; F; methyl; ethyl; n-propyl; i-propyl; —CF$_3$; n-butyl; and t-butyl; and $L_1$ is $C_{1-6}$ alkylene, optionally substituted.

27. The method according to claim 21, wherein the crosslinker comprises divinylbenzene.

* * * * *